United States Patent
Crunkelton

(10) Patent No.: US 6,273,239 B1
(45) Date of Patent: Aug. 14, 2001

(54) CONVEYOR DEVICE

(76) Inventor: William S Crunkelton, 306 N. Ruth Rd., Avon Park, FL (US) 33825

( * ) Notice: Subject to any disclaimer, the term of this patent is extended or adjusted under 35 U.S.C. 154(b) by 0 days.

(21) Appl. No.: 09/480,307

(22) Filed: Jan. 10, 2000

(51) Int. Cl.[7] .................................................. B65G 19/00

(52) U.S. Cl. ........................................... 198/728; 414/416

(58) Field of Search .................................... 198/725, 728, 198/735.1, 726, 418.7, 426; 414/416, 417

(56) References Cited

U.S. PATENT DOCUMENTS

| | | | |
|---|---|---|---|
| 4,717,012 | * | 1/1988 | Swapp et al. ......................... 198/425 |
| 4,890,723 | * | 1/1990 | Debuisson et al. ................... 198/716 |

* cited by examiner

Primary Examiner—Kenneth W. Noland

(57) ABSTRACT

A conveyer device is provided which has a large two dimensionally disposed collection zone upon which workpieces may fall for subsequent conveyance thereacross to a discharge area. The conveyer device may be fixedly positioned or may be moveable during operation. Construction of the conveyer device provides for an extremely low profile which enables insertion under objects where the workpieces to be collected and conveyed may reside. Such conveyers are particularly suited for use during a harvesting of crops and particularly when a mechanical harvesting is employed. Optionally, the collection zone may have a series of passageways distributed thereacross to provide for debris separation from the workpieces for removal of the debris during the collection and conveyance process. The workpiece engagement members operate in an endless loop pattern relative to the collection zone. The low profile nature of the conveyer device results partially from an angular offset of drive means which operate to repetitively move the workpiece engagement members in an endless loop pattern. The workpiece engagement members move across the collection zone in a direction of conveyance at a gathering position relative to workpieces positioned on the collection zone and relative to the collection zone in a direction opposing the direction of conveyance at a passage position relative to workpieces positioned on the collection zone.

20 Claims, 15 Drawing Sheets

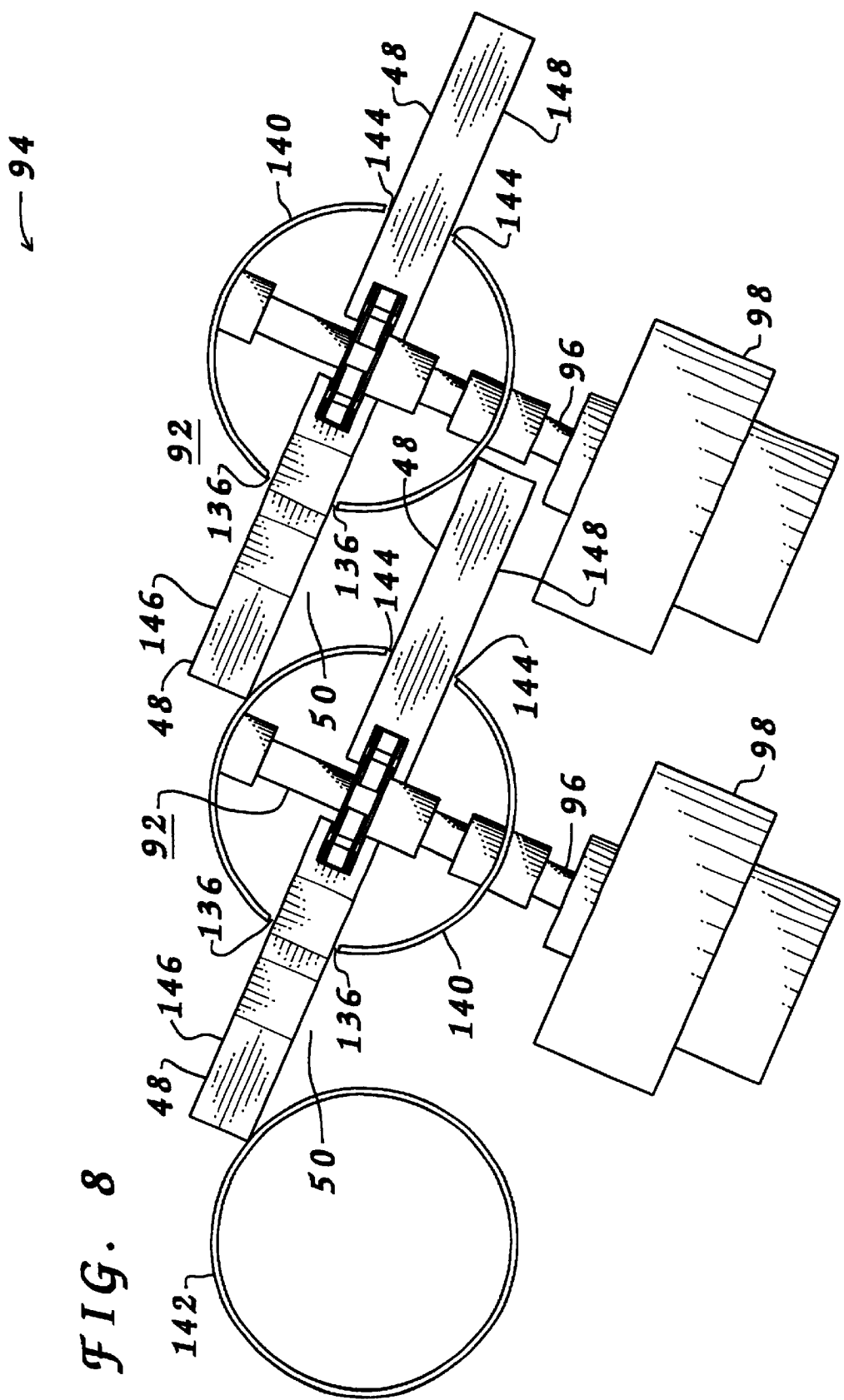

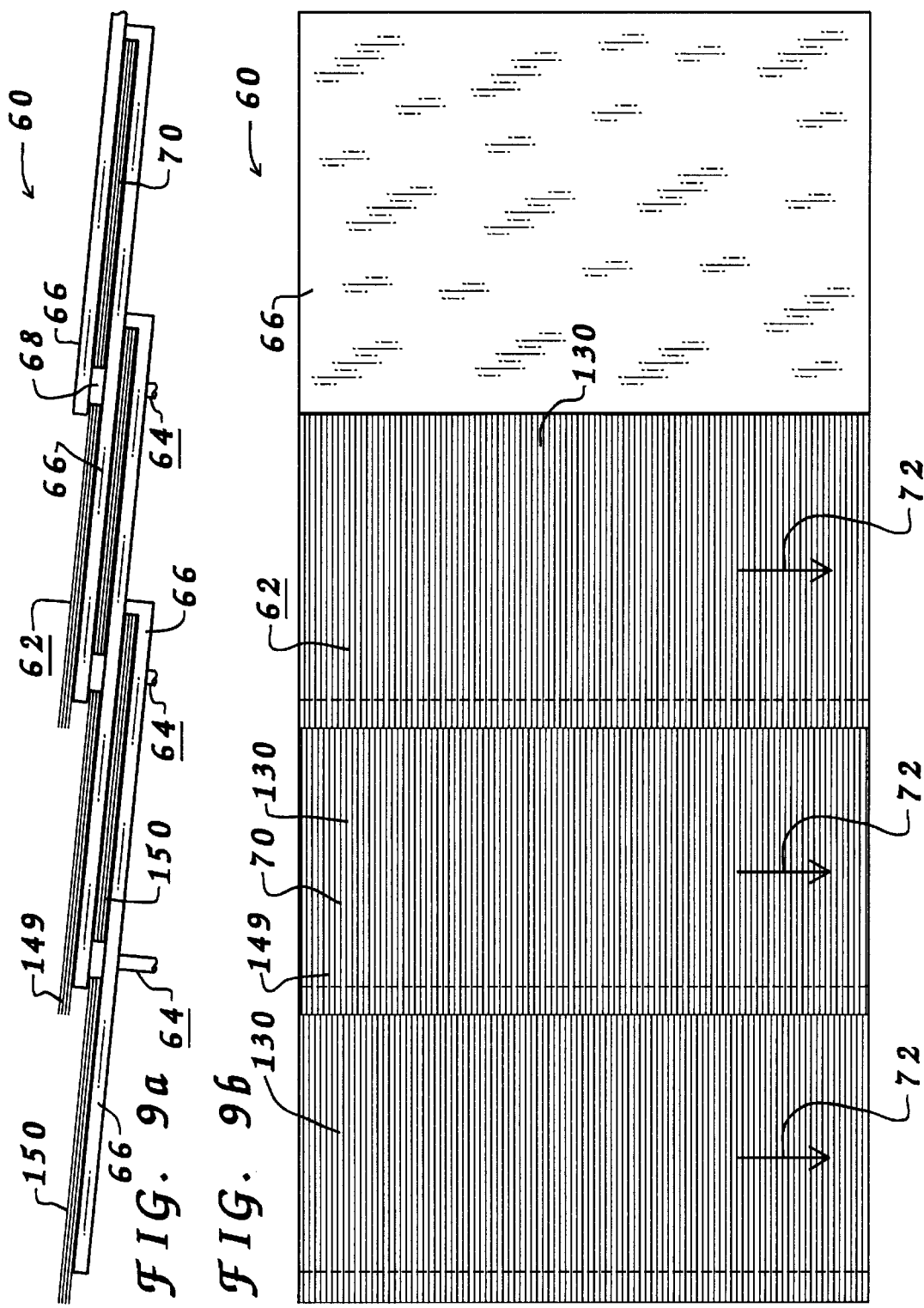

CONVEYOR DEVICE

BACKGROUND

1. Field of the Invention

Generally, the invention relates to conveyer devices. More specifically, the invention relates to such devices which have an extensive two dimensionally disposed collection zone and a plurality of transfer assemblies distributed across the collection zone to provide for the desired conveyance.

2. Description of the Prior Art

Numerous methods exist to convey objects. Typical examples of conventional conveyers include those having moving belts of a desired width which convey objects resting thereupon. Ordinary belt type conveyers are limited to operation where the conveyance is generally aligned with horizontal. Such belt type conveyers may be utilized to convey objects resting thereupon vertically when paddles are attached to the belt for movement therewith. Numerous other types of conveyer assemblies are conventionally known in the art.

Various deficiencies exist with existing conveyer devices which typically lack a relatively large, two dimensionally disposed, collection zone. Various attempts have been made to provide a conveyer device capable of collecting falling workpieces for subsequent conveyance. These attempts have been less efficient than desired. As such, it may be appreciated that there continues to be a need for a conveyer device which provides a large two dimensionally disposed collection zone upon which workpieces may fall and be conveyed to a discharge area. The present invention substantially fulfills these needs.

SUMMARY

In view of the foregoing disadvantages inherent in the known types of conveyer devices, your applicant has devised a conveyer device for a conveyance of workpieces in a direction of conveyance. The conveyer device has a power source, means to transfer power from the power source, a plurality of troughs forming a collection zone and a plurality of transfer assemblies powered by the power source. The collection zone has a length and a width. Each of the transfer assemblies act to provide for conveyance of any workpieces positioned within a respective trough. Each transfer assembly has an endless loop drive member and drive means with the endless loop drive member moving in an endless loop in response to power from the means to transfer power. The drive means further has at least one workpiece engagement member which has a cycle of movement. The drive means provides for moving any encountered workpieces within the respective trough across the collection zone in a direction of conveyance. The cycle of movement of the workpiece engagement member having a collecting direction and a redeployment direction. The collecting direction provides for the workpiece engagement member to move relative to the respective trough in the direction of conveyance at a gathering position. This provides for the respective workpiece engagement member to move relative to the respective trough and make contact with at least a first encountered workpiece present within the respective trough to move any encountered workpieces in the direction of conveyance. The redeployment direction provides for the workpiece engagement member to move relative to the respective trough opposite the direction of conveyance at a passage position. This provides for the respective workpiece engagement member to remain at least substantially outside of the respective trough while moving in the redeployment direction.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for conveyer device which may collect falling workpieces from a large, two dimensionally disposed, collection zone and convey the workpieces for subsequent discharge from the collection zone.

Other objects include;

a) to provide for a conveyer device which may collect falling workpieces while the conveyer device is positioned in close proximity to a ground surface with the collection zone of the conveyer device positioned in close proximity to the ground surface.

b) to provide for a plurality of conveyance assemblies disposed across the collection zone with each conveyance assemblies having workpiece engagement members attached thereto wherein each workpiece engagement member moves in an endless loop pattern relative to the collection zone and alternating between a collecting period wherein the workpiece engagement member moves in a collecting direction and a redeployment period wherein the workpiece engagement member moves in redeployment direction.

c) to provide for a plurality of troughs extending across the collection zone.

d) to provide for a plurality of passageways though the collection zone of the conveyer device for passage therethrough of debris for elimination of the debris from the conveyance procedure.

e) to provide for each trough to be defined by opposing support surfaces with a passageway therebetween defining the base of the trough.

f) to provide for each workpiece engagement member to move relative to the trough at a gathering position during the collecting period of the endless loop pattern wherein a portion of the workpiece engagement member makes contact with a first encountered workpiece present within the trough to move any encountered workpieces in a direction of conveyance relative to the collection zone.

g) to provide for each workpiece engagement member to move relative to the trough at a passage position during the redeployment period of the endless loop pattern wherein the workpiece engagement member remains substantially outside of the trough.

h) to provide for each endless loop drive member to be positioned within a housing having an access slot extending therealong for passage therethrough of the workpiece engagement members during the collecting period of the endless loop pattern of the workpiece engagement members.

i) to provide for each endless loop drive member to be positioned within the housing wherein the workpiece engagement members remain within the housing during the redeployment period of the endless loop pattern of the workpiece engagement members.

j) to provide for a transfer movement of the conveyer device generally perpendicular to a direction of conveyance during a conveyance procedure.

k) to provide for a deployment movement of the conveyer device generally aligned with the direction of conveyance during the conveyance procedure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 7b is sectional view as taken from the section line '7b' shown in FIG. 7a.

FIG. 8 is a front elevational view of an adjacent pair of transfer assemblies utilizing outside redeployment and positioned within respective tubular housings.

FIG. 9a is a front elevational view of a portion of a mat type conveyer device.

FIG. 9b is a top plan view of the portion of the mat type conveyer device depicted in FIG. 9a.

DESCRIPTION

Figure 1:
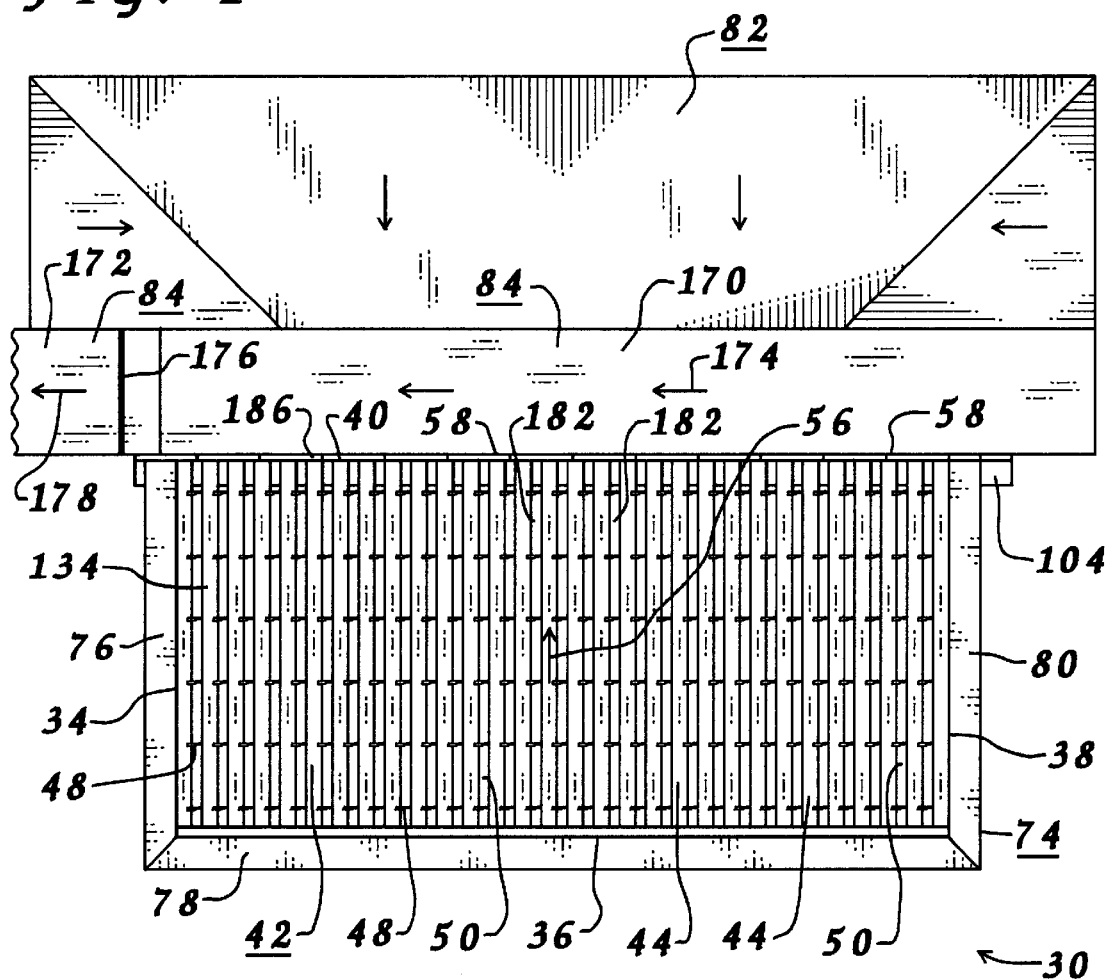
FIG. 1 is a top plan view of a conveyer device having positioned adjacent thereto a secondary conveyer device.

Reference is now made to the drawings where like reference numerals refer to like parts throughout the various views.

Conveyer Device—Overview

Conveyer devices having features of the present invention will provide for conveyance of workpieces in a direction of conveyance from any point on a large two dimensionally disposed collection zone to a discharge area during a conveyance process. The collection zone most likely will have a length generally aligned with the direction of conveyance and a width generally perpendicularly intersecting the direction of conveyance. Preferably the width will be greater than the length. The term collection zone as used herein refers to a collective series of surfaces upon which workpieces may fall and be positioned thereon for conveyance thereacross. Depending upon the configuration of the structures comprising a particular conveyer device having features of the present invention the collection zone may be substantially planar thereacross or may have a series of repetitive elevational changes thereacross.

It is possible to provide for the collection zone to have a convergence at the discharge area significantly narrower than the width of the collection zone distal from the discharge area. It is also possible to provide for the discharge area to comprise a plurality of distinct discharge areas where a convergence occurs for distinct portions of the collection zone. Preferably, the discharge area will span substantially the entire width of the collection zone wherein any workpieces dropped on the collection zone are conveyed across the collection zone generally parallel to all other such conveyances.

Conveyer devices having features of the present invention may be utilized to convey a wide variety of workpieces for several useful purposes. A first example of such a useful purpose resides solely in wide area collection of falling workpieces and conveyance to a discharge area. This purpose is particularly useful when utilized during a harvesting of various crops. A second example may involve such collection and conveyance wherein a debris is routinely intermixed with the workpieces and separation of the debris, or at least a significant portion of the debris, is performed by the conveyer device prior to discharge of the workpieces at the discharge area. This purpose is also particularly useful when utilized during a harvesting of various crops where portions of the parent plant or tree are separated therefrom and intermixed with the crop during the harvesting procedure. A third example may involve sorting of workpieces based upon a sizing of the respective workpieces during the conveyance. This purpose is particularly useful when grading various workpieces, and particularly when those workpieces are a crop.

Numerous configurations are possible for conveyer devices having features of the present invention. Generally, these configurations may be separated into two classes of devices. A first class provides for passageways distributed across the collection zone for passage therethrough of objects smaller than a predefined size. This is particularly desirable for elimination of debris from the collection process or for sorting of workpieces by size. A second class provides for the collection zone to substantially have a solid base. This is particularly desirable when the collection and/or conveyance process does not readily introduce debris or when any introduced debris is subsequently removed following the collection and/or conveyance process as performed by the conveyer device.

Figure 2:
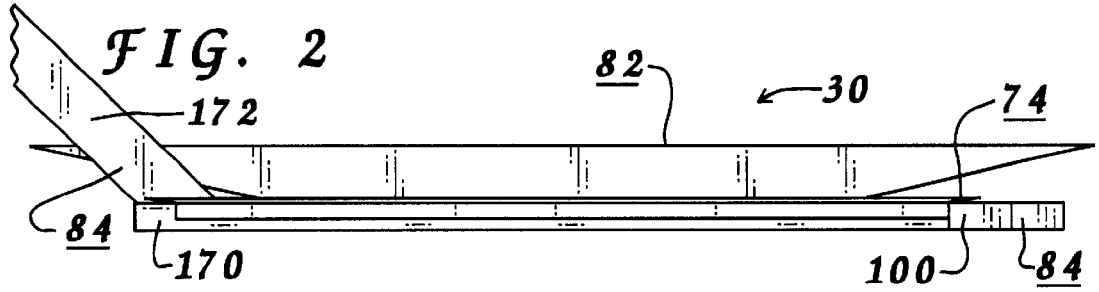
FIG. 2 is a front elevational view of the assembly depicted in FIG. 1.
Figure 3:
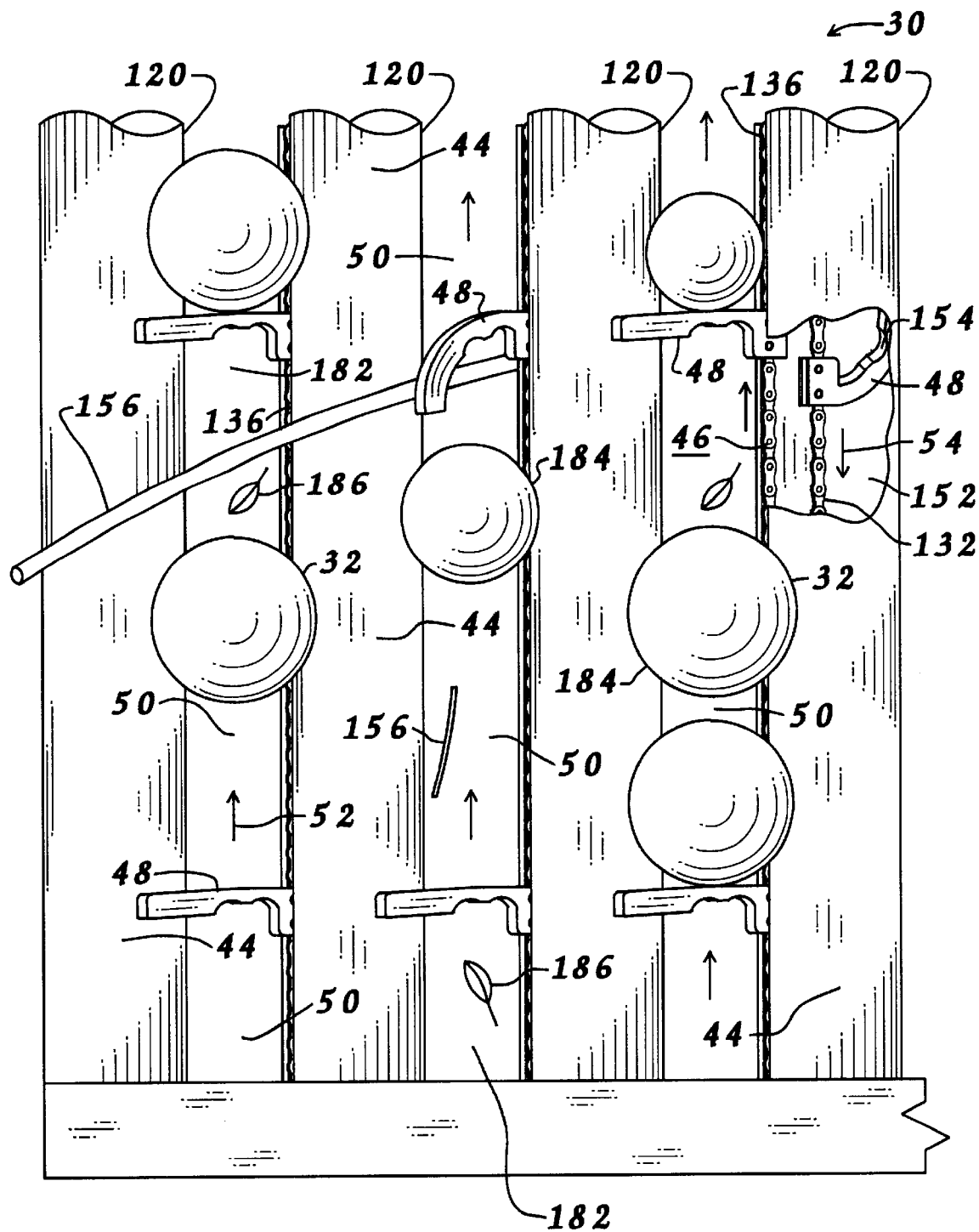
FIG. 3 is a top plan view of a portion of the conveyer device depicted in FIG. 1.
Figure 10:
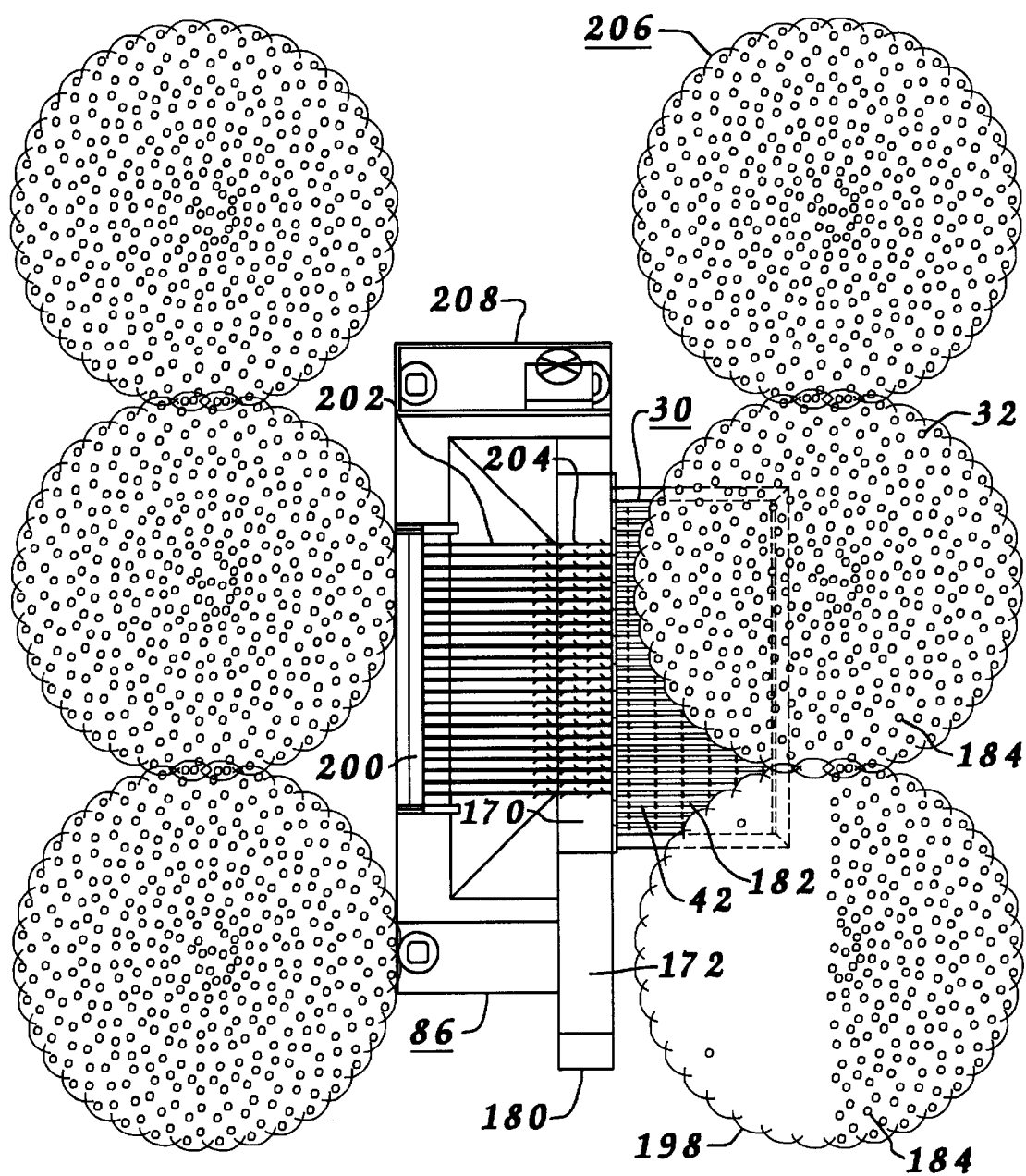
FIG. 10 is a top plan view of a fruit harvesting machine having a conveyer device attached thereto with an arm assembly of the harvesting machine in a retracted position.
Figure 11:
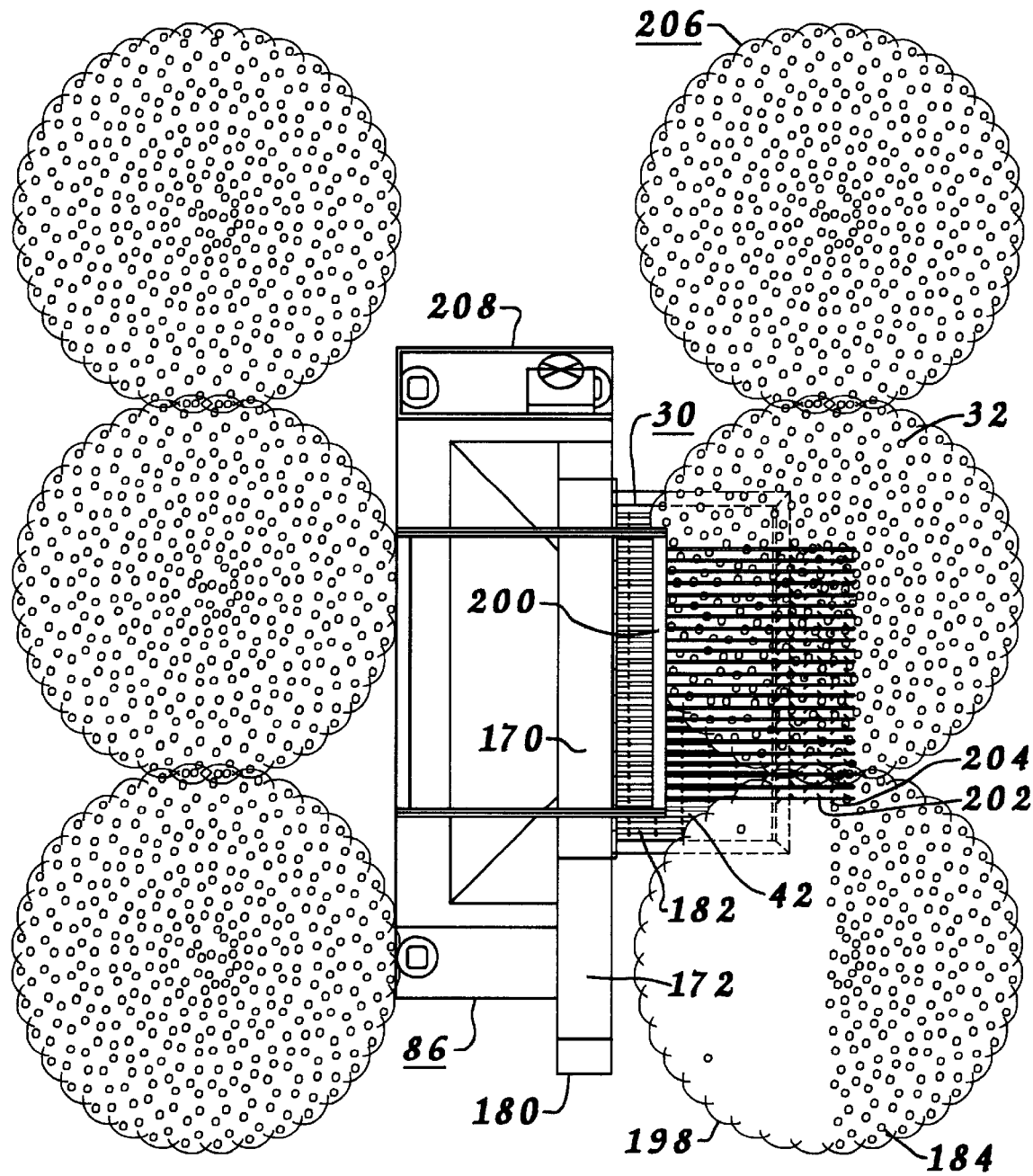
FIG. 11 is a top plan view of the harvesting machine depicted in FIG. 10 with the arm assembly of the harvesting machine in an extended position.

FIG. 1 through FIG. 7b and 10 through FIG. 17 depicts a conveyer device 30, or portions thereof, which provides for conveyance of workpieces 32, see FIG. 3, FIG. 10 and FIG. 11. Conveyer device 30 has a first side perimeter 34, a front perimeter 36, a second side perimeter 38 and a rear perimeter 40, see FIG. 1, defining a collection zone 42. Distributed across collection zone 42 are a plurality of support surfaces 44. Positioned beneath most support surfaces 44 is a transfer assembly 46, see FIG. 3 through FIG. 7a, and having extending therefrom a plurality of workpiece engagement members 48. During operation of conveyer device 30 workpiece engagement members 48 move relative to a trough 50 situated between adjacent support surfaces 44. This movement alternates between movement in a collecting direction 52, see FIG. 3 and FIG. 6c, and a redeployment direction 54, see FIG. 3 and FIG. 6a. When a respective workpiece engagement member 48 is moving in collecting direction 52 it is moving in a direction of conveyance 56 for the overall conveyer device 30 toward a discharge area 58 which extends across substantially the entire length of rear perimeter 40.

The collection zone may be substantially flat with a drive means formed of a plurality of transfer assemblies in the form of collection mats distributed across the collection zone. In this type of embodiment each collection mat, either a continuous brush type, a series of spaced brush type or a series of paddle type, circulate below a cover plate during a redeployment period and above an adjacent cover plate during a collecting period. Such embodiments are particularly suited to collection of nuts or berries during a harvesting operation thereof.

FIG. 9a and FIG. 9b depict a portion of a conveyer device 60 having a collection zone 62 upon which workpieces, not shown in these views, may fall and be conveyed thereacross. Conveyer device 60 is particularly suited to collection of nuts and berries during a harvesting operation thereon. Conveyer device 60 has a series of transfer assemblies 64. Each transfer assembly 64 has a cover plate 66 an endless drive member 68 and a multiplicity of brushes 70 attached to each endless drive member 68. Each transfer assembly 64 provides for movement of brushes 70 alternating between movement above one adjacent cover plate 66 and movement below an opposing adjacent cover plate 66 in an endless loop pattern. This arrangement provides for the entire exposed surface of collection zone 62 to be formed of brushes 70 and for that exposed surface to be moving in a direction of conveyance 72. Each cover plate 66 also extends beneath an adjacent cover plate 66 to provide for containment and protection of brushes 70 while moving in a direction opposing direction of conveyance 72. This arrangement provides for conveyer device 60 to be used in extremely close proximity to the ground without concern for contamination.

In certain situations it is desirable to expand the collection zone beyond the boundaries of the conveyance structures. This is particularly true in those situations where the falling of the workpieces are such that an exact estimation of contact with the collection zone is impossible. In these situations it is desirable to provide for an extension assembly bordering the collection zone on at least one side and having a declining surface leading toward the collection zone for gravity feed of workpieces therefrom to the collection zone. It is particularly expedient to form this extension assembly of a flexible material when the conveyer device is moveable during the collection and conveyance procedure. This is particularly true when the conveyer device is utilized during a harvesting operation performed on a plant or tree. Providing such flexibility may prevent damage to the parent plant of the crop being harvested.

FIG. 1 and FIG. 2 depict conveyer device 30 having an extension assembly 74 positioned thereabout. Extension assembly 74 comprises a first side extension member 76, a front extension member 78 and a second side extension member 80. Additionally, a rear extension assembly 82 is positioned behind a secondary conveyance device 84. First side extension member 76, front extension member 78 and second side extension member 80 are each angularly oriented to provide for gravity transfer of any workpieces when land thereon to conveyer device 30. Rear extension assembly 82 is angularly oriented to provide for gravity transfer of any workpieces which reside thereon back to secondary conveyance device 84.

Without regard for the specific configuration of the collection zone of the conveyer device, the collection zone may be generally aligned with horizontal or may be offset therefrom at a desired angle. In certain embodiments such offset may be substantial.

Figure 12:
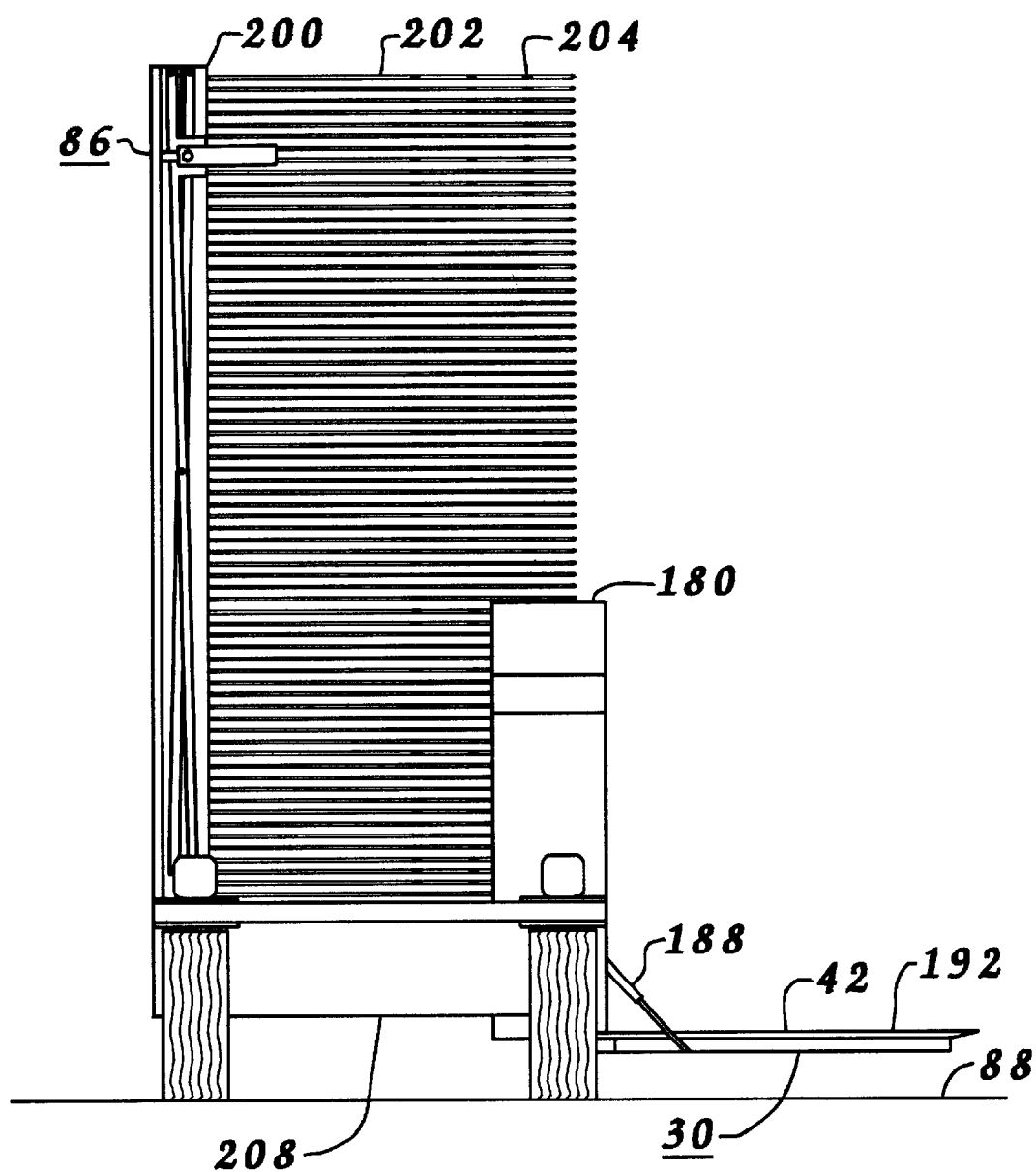
FIG. 12 is a rear elevational view of the harvesting machine in the operational state depicted in FIG. 10.
Figure 13:
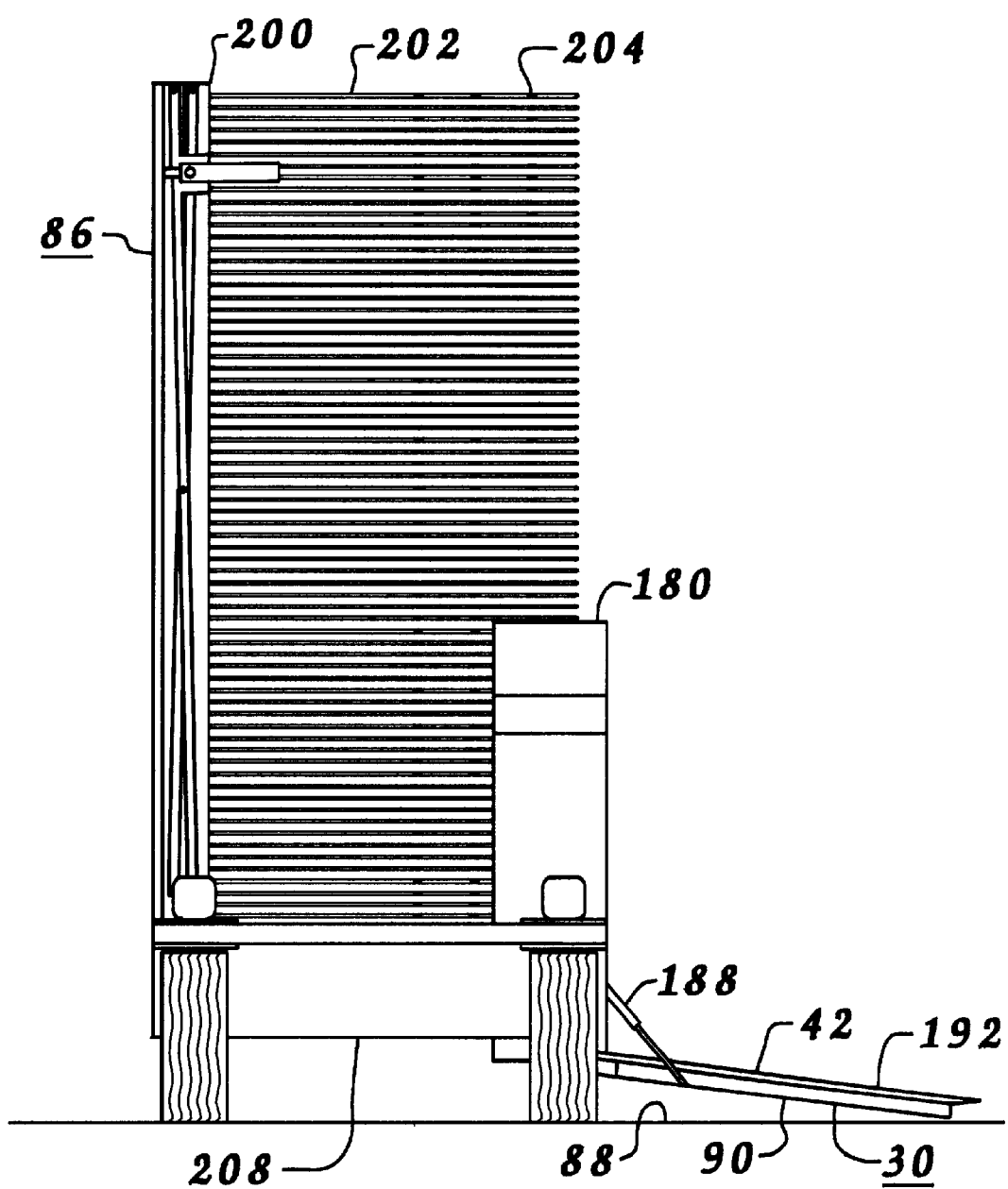
FIG. 13 is a rear elevational view of the harvesting machine depicted in FIG. 10 with the conveyer device positioned in a descending orientation.
Figure 14:
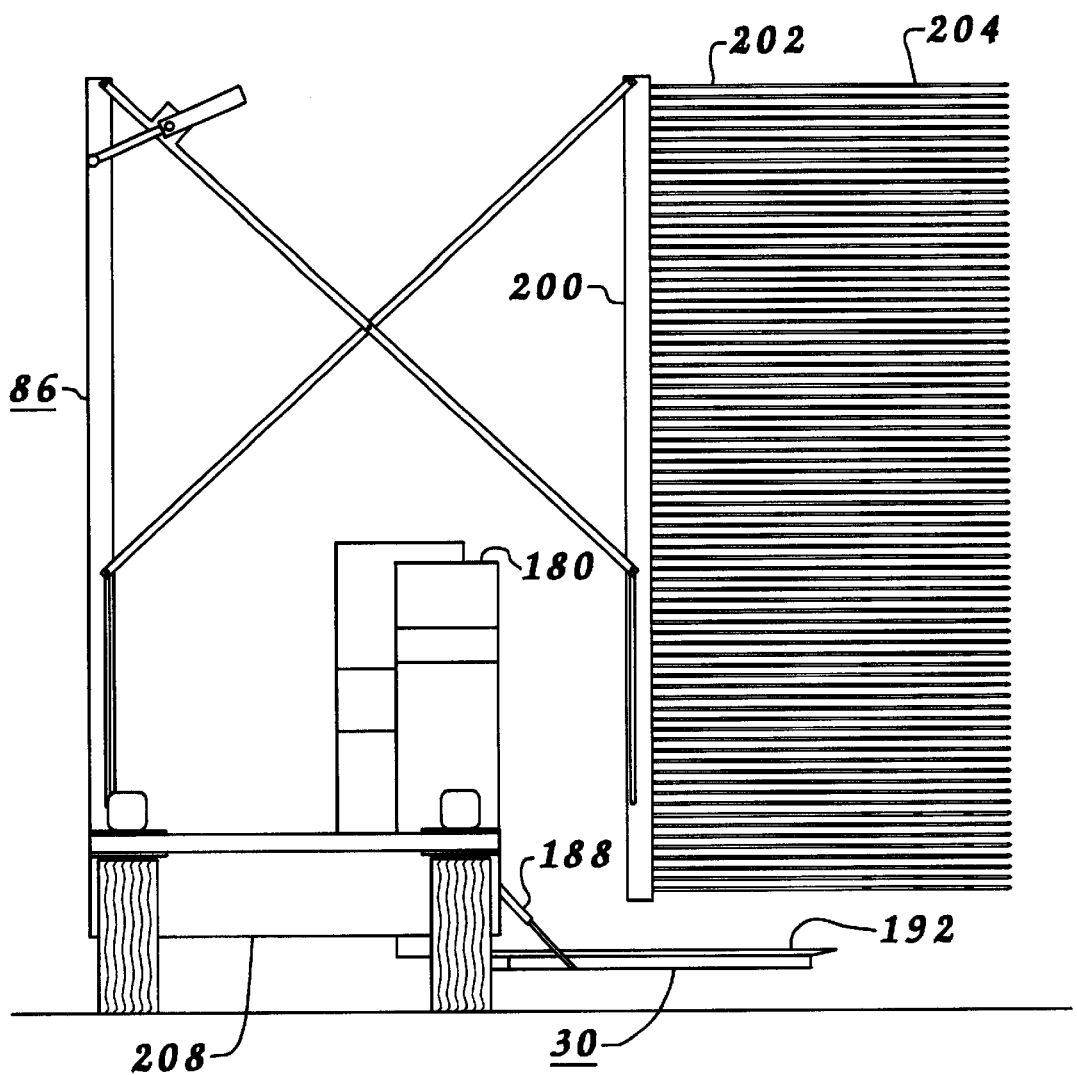
FIG. 14 is a rear elevational view of the harvesting machine in the operational state depicted in FIG. 11.

FIG. 12 depicts portions of conveyer device 30 which form collection zone 42 extending outward from a harvesting machine 86 generally aligned with a horizontal 88. FIG. 13 depicts portions of conveyer device 30 which form collection zone 42 extending outward from harvesting machine 86 wherein an angular offset 90 from horizontal 88 exists. This provides for the discharge area, not shown in this view, to be elevated above the prevailing elevational height of collection zone 42. Alternatively, the discharge area may be at a lower elevational height than the collection zone. Similarly, the opposing sides of the collection zone may have unique elevational heights wherein the discharge area, and other traversing cross sections of the collection zone, are angularly offset relative to horizontal.

Power Transfer Means

Numerous methods are known in the art to provide for powering movement of a plurality of like components wherein the like components are generally aligned in a row and many of these methods may be employed to provide the desired power transfer means of the present invention.

A first power transfer method involves providing distinctly separate structures which transfer power separately to each transfer assembly, or a select set of transfer assemblies, of the conveyer device.

An embodiment of this first power transfer method is depicted in FIG. 8. Each transfer assembly 92 of a conveyer device 94 has a transfer assembly shaft 96. A separate and distinct drive unit 98 is directly attached to each respective transfer assembly shaft 96. Each drive unit 98 may be powered by any desired power source, such of hydraulic, pneumatic or electric. Each combination of transfer assembly 92, transfer assembly shaft 96 and drive unit 98 is mounted to provide for the desired angularly offset means. While each adjacent transfer assembly 92 is depicted as having a unique drive unit 98 attached thereto at a common end of the collection zone, it is possible to provide for a staggering of drive unit 98 placement alternating between opposing ends of the collection zone. This arrangement provides addition space between adjacent drive units.

A second power transfer method involves providing a structure which simultaneously and uniformly transfer power to all deployed transfer assemblies of the conveyer device.

Figure 7A:
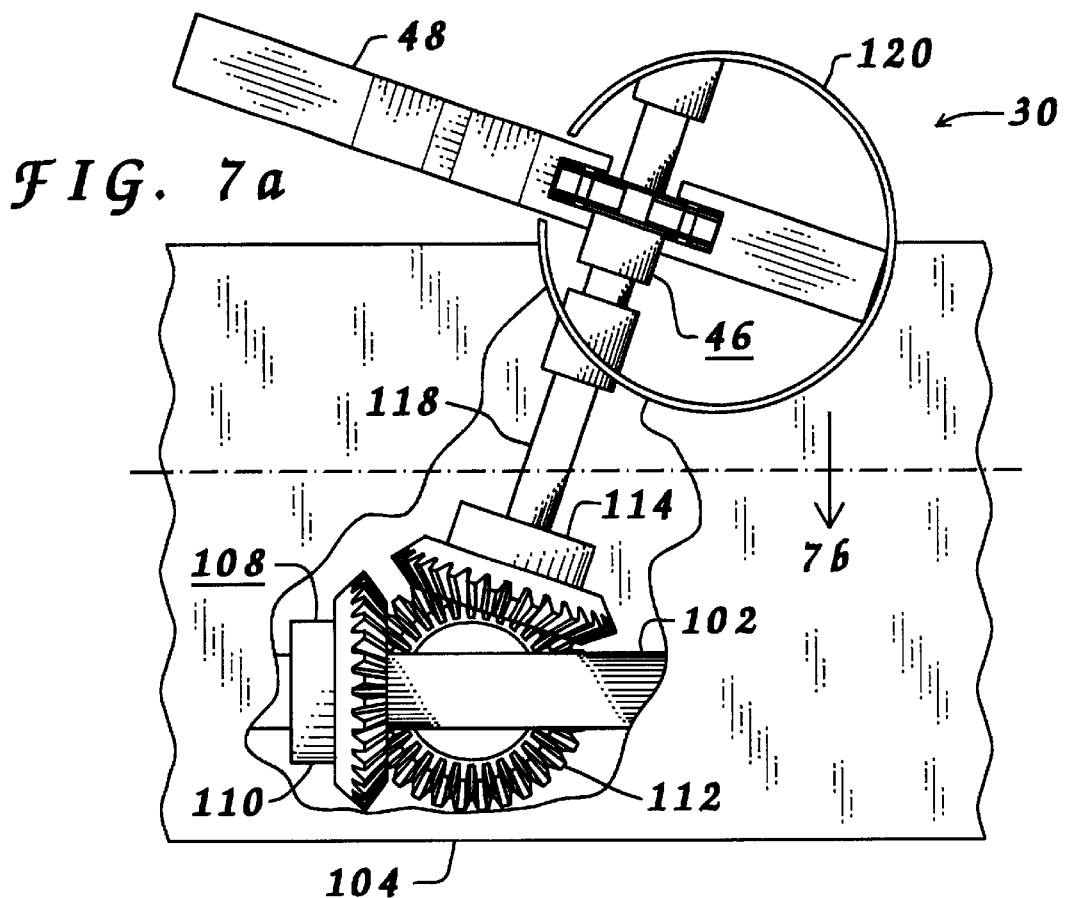
FIG. 7a is a front elevational view of a portion of a power distribution housing with a section cutaway to reveal an angular offset power transfer assembly providing power to a transfer assembly.
Figure 7B:
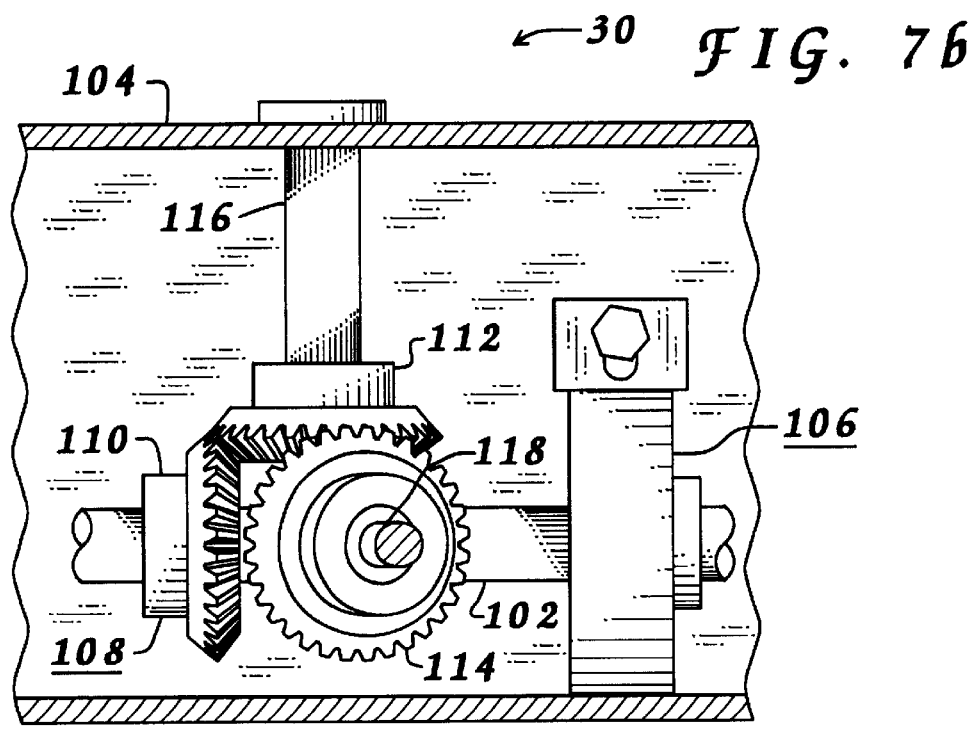

An embodiment of this second power transfer method is depicted in FIG. 2, FIG. 7a and FIG. 7b. A power source 100, see FIG. 2, as exampled by a hydraulic, pneumatic or electric drive, provides for rotation of a distribution shaft 102, see FIG. 7a and FIG. 7b, which spans collection zone 42 below discharge area 58 within a power distribution housing 104. Discharge area 58 spans substantially the entire width of collection zone 42. Distribution shaft 102 is retained within power distribution housing 104 by a series of spaced bearing assemblies 106, see FIG. 7b. For each transfer assembly 46, and affixed to distribution shaft 102, is an angular offset power transfer assembly 108, see FIG. 7a and FIG. 7b. Each angular offset power transfer assembly 108 further comprises a first transfer gear 110, a second transfer gear 112 and a third transfer gear 114. First transfer gear 110 is attached to distribution shaft 102 for rotation therewith. Rotation of first transfer gear 110 is substantially perpendicular to the prevailing plane of the collection zone. First transfer gear 110 engages second transfer gear 112 which is mounted to an idler shaft 116, see FIG. 7b, for rotation thereabout. Idler shaft 116 is fixedly positioned within power distribution housing 104. Rotation of second transfer gear 112 is substantially perpendicular to the prevailing plane of the collection zone. Second transfer gear 112 engages third transfer gear 114 which is mounted to a transfer assembly shaft 118 for rotation thereof. Transfer assembly shaft 118 is rotatably secured to a tubular housing 120, see FIG. 7a. Tubular housing 120 is securely attached to power distribution housing 104. Rotation of third transfer gear 114 is offset relative to the prevailing plane of the collection zone. Alternatively, two (2) transfer gears may be employed to provide the desired offset rotation of transfer assembly shaft 118 relative to distribution shaft 102.

Troughs and Support Surfaces

Troughs may be formed across the collection zone for gathering therein of workpieces for subsequent conveyance within a respective trough. To this end support surfaces are positioned adjacent each trough to provide for ready gravitational movement of workpieces into a respective trough. These support surfaces may have various shapes depending upon the composition of the workpieces being conveyed. Preferably, the support surfaces will have an arced configuration to minimize any damage which may be inflicted upon the workpieces when falling upon the collection zone. Additionally, if desired, resilient padding may be affixed, or otherwise positioned relative to, the support surfaces to provide for impact absorption to protect the workpieces falling thereupon. If desired, such resilient padding may be affixed to any desired surfaces of the collection zone, including to the troughs, to provide for protection of the workpieces falling thereupon.

Figure 4:
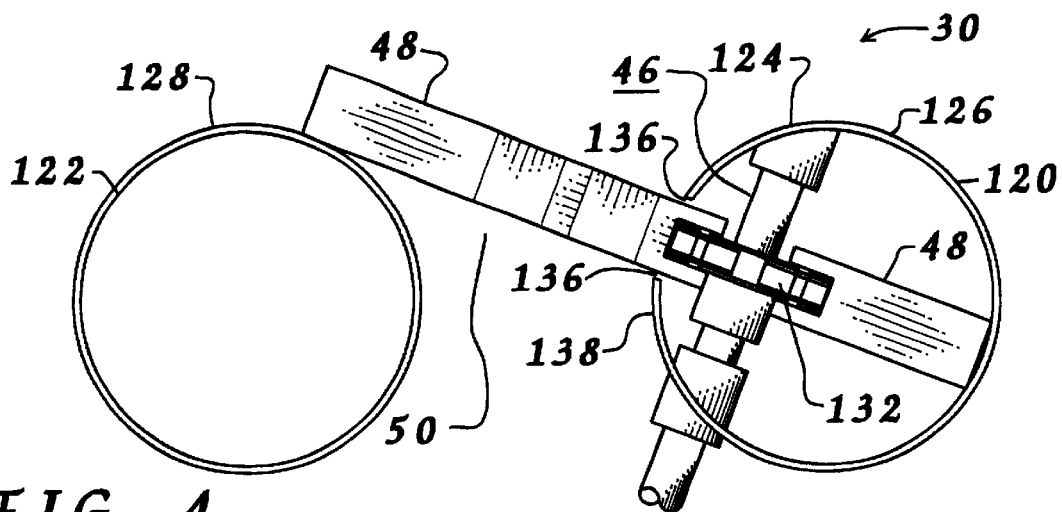
FIG. 4 is a front elevational view of a portion of a transfer assembly utilizing inside redeployment and positioned within a tubular housing.

FIG. 4 depicts an inactive tubular member 122 and tubular housing 120 with transfer assembly 46 installed in tubular housing 120. Inactive tubular member 122 will typically only exist at one periphery edge of collection zone 42. Each tubular housing 120 has an upper extent 124, which is an outer upper surface 126, and which acts as the support surface. Each inactive tubular housing 122 similarly has an upper extent 128. Trough 50 is formed by a cooperation of upper extents 124 of adjacent tubular housing 120 or by a cooperation of upper extent 124 of tubular housing 120 and upper extent 128 of an adjacent inactive tubular housing 122.

As disclosed elsewhere herein the collection zone may be formed of a moving mat type assembly formed of a plurality of mat surfaces. Such a conveyer device is particularly suited for a conveyance of relatively small objects such as utilized during a harvesting or a processing of nuts and berries.

FIG. 9a and FIG. 9b depict three (3) adjacent sets of a brush support surface 130. Each brush support surface 130 is formed by a cooperation between brushes 70 of a respective transfer assembly 64.

Transfer Assemblies

Conveyer devices having features of the present invention will have a plurality of transfer assemblies distributed across the collection zone. These transfer assemblies will have at least one workpiece engagement member and means to move that workpiece engagement member alternatingly in a collection direction along the collection zone and in a redeployment direction along the collection zone. While various constructions may be utilized to provide the means to move the workpiece engagement members, a particularly expedient methods involves utilization of an endless loop drive member.

The workpiece engagement members are more fully disclosed elsewhere herein and provide for a moving contact with at least select workpiece to move the workpieces along the support surfaces of the collection zone. The workpiece engagement members are respectively attached to, or relative to, the endless loop drive member which provides for production of the desired motion to the workpiece engagement member.

The transfer assemblies may be dissimilar in construction depending upon the specific intended use of the overall conveyer device. Preferably, all of the transfer assemblies of the conveyer device will be substantially identical. This provides for ease of construction and maintenance of the conveyer device. Depending upon the specific intended use of the overall conveyer device it is a strong desire to provide as much protection to the endless loop drive member as possible. A particularly expedient method of satisfying this desire resides in at least partially enclosing the endless loop drive member within an elongated housing member. This arrangement provides considerable protection of components of the transfer assembly from damage by external influences. Such housing members also provide for ready utilization of an access slot along the housing member for passage of the workpiece engagement member therethrough. The access slot provides for such passage therethrough of the workpiece engagement members along a side slightly above a horizontally intersecting midpoint on the tubular housing which allows for the desired transfer assembly angular offset.

It is a desire to prevent intrusion of debris into the elongated housing member through the access slot. This may be readily accomplished by providing a barrier to close the access slot between adjacent workpiece engagement members which extend through the access slot. A preferred method of accomplishing this involves placement of the endless loop drive member for travel generally at the outer perimeter of the access slot. Another preferred method of accomplishing this involves providing a flexible resilient barrier fixedly positioned along substantially the entire length of the access slot. Such a barrier may be constructed of a rubber or plastic strip, or strips, or of a continuous brush type material. Alternatively, the barrier member may be attached to the endless loop member between adjacent workpiece engagement members for movement therewith.

FIG. 3 depicts a preferred method of preventing intrusion of debris through access slot 136 wherein endless loop drive member 132 generally closes access slot 136.

Each endless loop drive member, being one example of means to move the workpiece engagement members, will have an endless belt installed to rotate around at least a first rotational guide and a second rotational guide, as conventionally known in the art. The endless belt may be formed from various materials with a particularly expedient choice being a metallic linked chain. Such a selection provides for strong dependable service and ready securement of any workpiece engagement members thereto. As conventionally known in the art various methods are known to provide for tension adjustment of endless loop drive members and many of these methods may be employed for the present invention. While numerous cross sectional shapes are envisioned and may be utilized for the housing member, a tubular design has proven to provide superior results.

Figure 5:
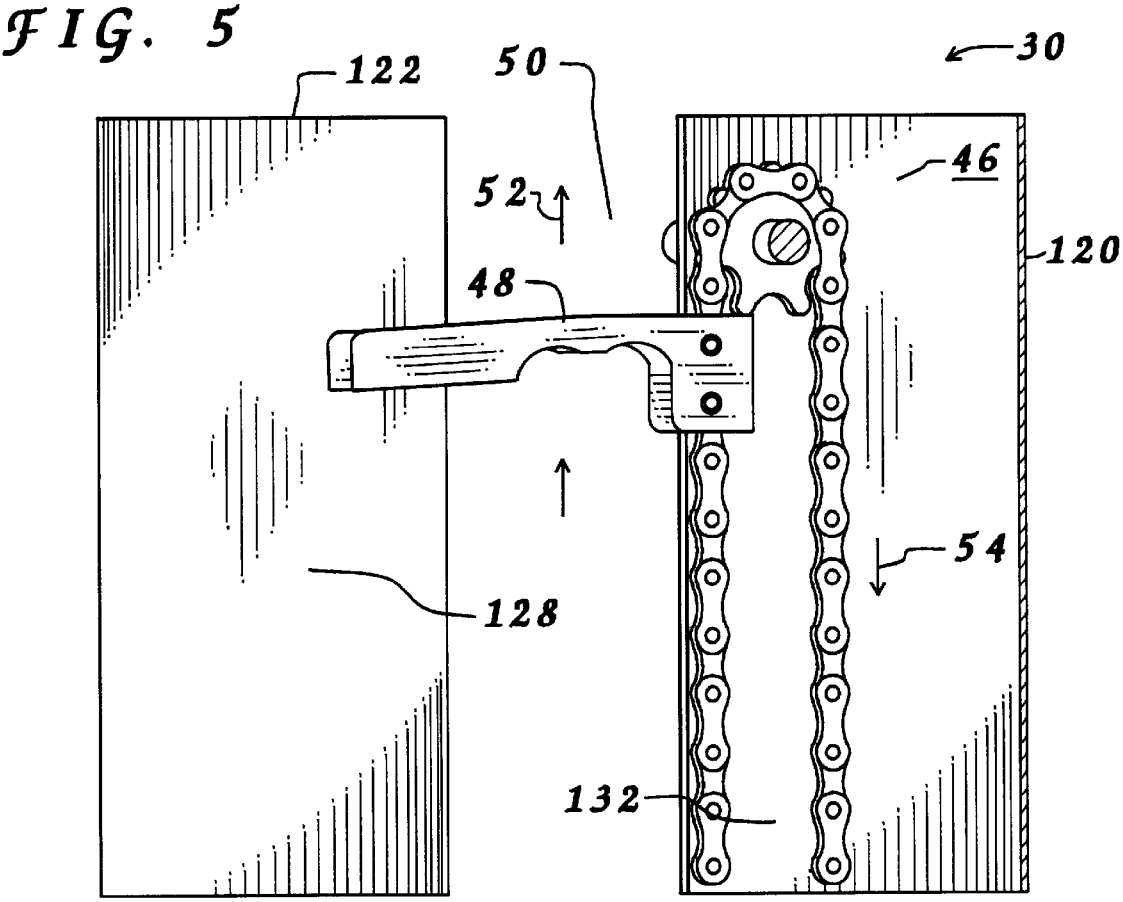
FIG. 5 is a top plan view of a portion of the transfer assembly shown in FIG. 4 with a portion of the tubular housing removed.

FIG. 4 and FIG. 5 depicts transfer assembly 46 having an endless loop drive member 132 and drive means in the form of workpiece engagement members 48 attached to endless loop drive member 132. Endless loop drive member 132 is a conventional chain as commonly known in the art. In this embodiment each transfer assembly 46 is housed within tubular housing 120 with tubular housing 120 having a longitudinal length 134, see FIG. 1. Tubular housing 120 has an access slot 136 extending along a lateral side 138 thereof. Access slot 136 provides for passage therethrough of workpiece engagement members 48 while each workpiece engagement member 48 is moving in collecting direction 52. This positioning of workpiece engagement members 48 provides for contact with workpieces positioned within trough 50. Tubular housing 120 acts to restrict each workpiece engagement member 48 while each workpiece engagement member 48 is moving therein in redeployment direction 54. This positioning of workpiece engagement members 48 while moving in redeployment direction 54 provides for prevention of contact with workpieces positioned within trough 50.

FIG. 8 depicts two (2) tubular housings 140 and an inactive tubular housing 142. Each tubular housing 140 has installed therein a respective transfer assembly 92 as generally described above. This embodiment provides for access slot 136, as disclosed above, for passage therethrough of workpiece engagement members 48 during the collecting period and while moving in the collecting direction. Additionally, each tubular housing 140 has a return access slot 144 positioned distal from access slot 136. Return access slot 144 provides for passage therethrough of workpiece engagement members 48 during the redeployment period and while moving in the redeployment direction. This arrangement provides for each workpiece engagement member 48 to be at a gathering position 146 relative to trough 50 while moving in the collection direction and at a passage position 148 relative to trough 50 while moving in the redeployment direction.

As previously disclosed FIG. 7a and FIG. 7b depict the desired angular offset of transfer assembly 46. This arrangement provides for workpiece engagement members 48 to have two (2) distinct elevational heights relative to the collection zone of conveyer device 30.

As depicted in FIG. 9a and FIG. 9b transfer assembly 64 may have attached thereto a multiplicity of brushes 70 which form brush support surface 130. While moving in direction of conveyance 72 above cover plate 66 brushes 70 have a greater elevational height than that elevational height while moving opposing direction of conveyance 72 below cover plate 66.

In certain configurations it may be desirable to provide for the conveyer device to be of a modular design. This provides for ready maintenance of the conveyer device. Additionally, such a design would provide for extremely fast repairs in the field in the case of mechanical failure. Ideally, a frame would provide for secure reception of a plurality of identical transfer assemblies. The frame would have means to supply each of the transfer assemblies with power. This arrangement may be utilized without regard for whether the power transfer means was direct delivery, as exampled by a power transfer shaft, or indirect delivery, as exampled by delivery of fluid or gas pressure, or electricity.

FIG. 8 depicts conveyer device 94 which may readily be utilized for the modular design configuration. Each of the units of the modular design would comprise transfer assembly 92, tubular housing 140, workpiece engagement members 48 and drive unit 98. A plurality of such units would be mountable relative to a frame, not shown in this view, to form conveyer device 94. Ready and simple replacement of a defective unit may then be made with minimal loss of production time.

Workpiece Engagement Members

Each transfer assembly will have attached relative thereto at least one (1) workpiece engagement member which will move relative to the transfer assembly in an endless loop pattern. The workpiece engagement member may engage at least a first encountered workpiece for conveyance of that workpiece across the collection zone. In one embodiment a mat of bristles forms the workpiece engagement member wherein a generally continuous surface is formed upon which the workpiece rest during conveyance therewith. In another embodiment a plurality of spaced workpiece engagement members move relative to a stationary support surface(s) which act to support the workpieces while a contacting workpiece engagement member acts to bias the workpiece for conveyance along the support surface. When spaced workpiece engagement members are employed each workpiece engagement member may be rigid or, more preferred, flexible to provide for a releasing yielding during contact with an obstruction.

Without regard for whether the moving mat type or the workpiece engagement member type is selected, each transfer assembly will move in a cycle of movement relative to the collection zone. This cycle of movement will include movement of the workpiece engagement member(s), or distinct portions thereof, repetitively alternating between movement in a collecting direction and movement in a redeployment direction.

FIG. 9a and FIG. 9b depict a multiplicity of bristles 149 which cooperate to form a workpiece engagement member 150. A plurality of such workpiece engagement members 150, (only three (3) shown), cooperate to form collection zone 62, of which a small portion is shown.

One embodiment provides a plurality of workpiece engagement members will be attached in spaced relationship to each transfer assembly wherein a spacing exists between each adjacent pair of workpiece engagement members while moving in the collecting direction across the collection zone.

This provides for movement of the encountered workpiece in contact with the workpiece engagement member and any workpiece(s) in contact with the encountered workpiece distal from the workpiece engagement member. The workpiece engagement members may have various shapes and be constructed of various types of materials depending upon the specific application intended.

FIG. 3 depicts a plurality of workpiece engagement members 48 attached to endless loop drive member 132 in spaced relationship. Preferably such spacing provides for positioning between each adjacent pair of workpiece engagement members 48 of several workpieces 32.

In certain applications it is a strong desire, though not a requirement, to provide each workpiece engagement member with a capability to release obstructions at a pressure which is sufficiently low enough to prevent damage from being inflicted upon either the obstruction or the conveyer device. This is particularly desirable when the conveyer device is utilized during harvesting of a crop. Several methods, as conventionally known in the art, may be utilized to provide such release at a select pressure limit. These include utilization of mechanical devices having resilient couplings as exampled by hinged members and springs. A particularly expedient method of providing this release feature resides in formation of the workpiece engagement member from a resilient material. This is a particularly desirable arrangement due to the lack of moving parts which may become damaged, worn or clogged with debris. When utilizing a closed housing for transfer of the workpiece engagement members in the redeployment direction this is a particularly desirable feature in order to minimize the space requirements within the closed housing members.

Many configurations of workpiece engagement members are possible depending upon the configuration of the specific conveyer device and particularly the specific transfer assembly and support surface combination. These configurations of workpiece engagement members include those having multiple components, including mechanical components. A particularly expedient method of construction of the workpiece engagement members involves forming each as a solid piece from a material having the desired level of flexibility. Such formation may be by a cutting process or by a molding process.

FIG. 3 depicts the desired flexibility of workpiece engagement members 48. In a first example a section of tubular housing 120 has been cutaway to reveal portions of transfer assembly 46 positioned therein. Workpiece engagement members 48 are shown extending through access slot 136 for engagement of workpieces 32 while moving in collecting direction 52. In the cutaway section workpiece engagement member 48 is shown during movement within an interior 152 of tubular housing 120 in redeployment direction 54 at a passage position 154. This workpiece engagement member 48 bends back to minimize sizing thereof during such passage within tubular housing 120. Also shown is a branch 156 which has entered trough 50 and which has been engaged by workpiece engagement member 48. Branch 156 resists displacement by workpiece engagement member 48 and workpiece engagement member 48 yields to provide for release of branch 156 at a pressure which does not endanger the various components of the transfer assembly, (not shown for that particular workpiece engagement member 48) or branch 156. The flexibility of workpiece engagement members 48 is sufficiently firm to prevent routine release of encountered workpieces 32 during movement of workpiece engagement members 48 in collecting direction 52.

When a tubular housing is provided for the transfer assembly and the workpiece engagement member is fully contained within the tubular housing during movement in the redeployment direction it is extremely desirable to provide for the workpiece engagement member to have at least two (2) district bending locations therealong. This provides for retaining a sufficient resiliency to provide for an application of sufficient pressure to an encountered workpiece to prevent premature release thereof while providing for a tight collapse of the workpiece engagement member so as to minimize space requirements within the tubular housing.

Figure 6C:
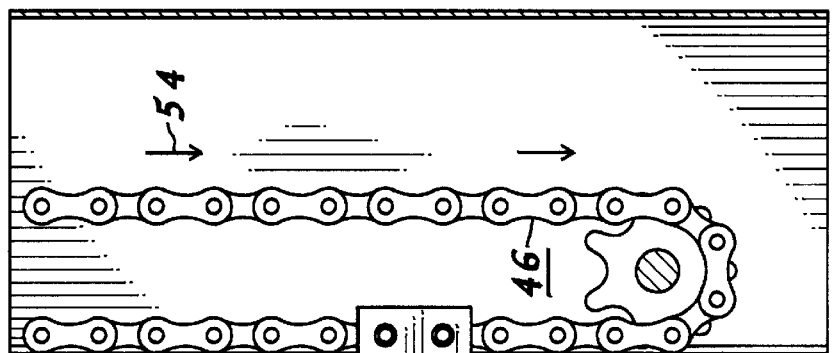
FIG. 6a through FIG. 6c are slightly angled plan views of a portion of the transfer assembly with a workpiece engagement member in various operational orientations.
Figure 6B:
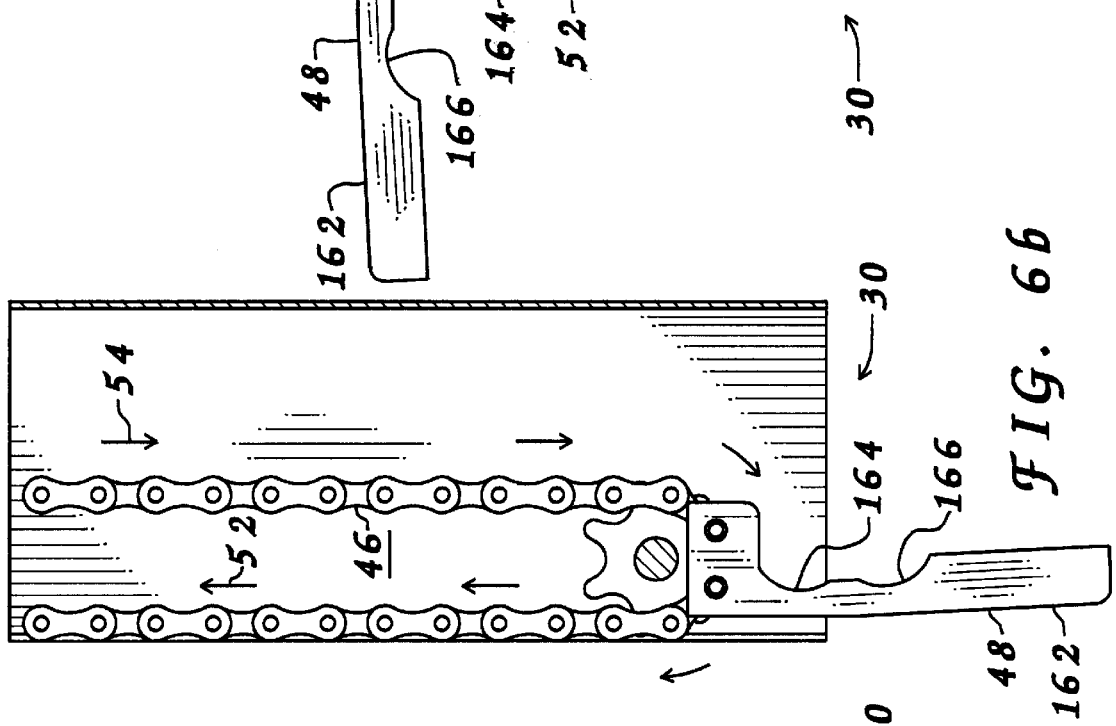
Figure 6A:
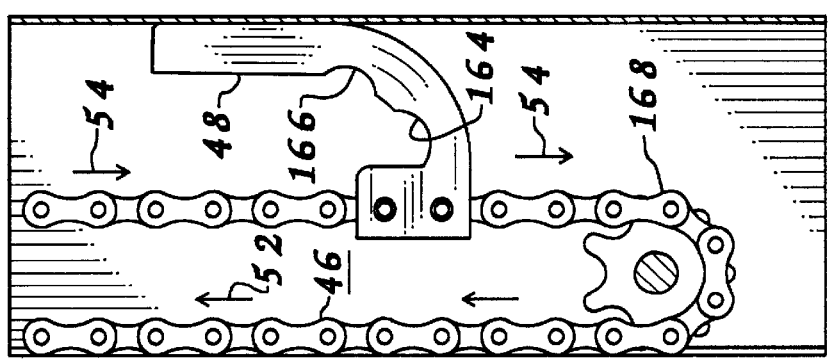

FIG. 6a through FIG. 6c depict workpiece engagement member 48 having a base portion 158 and an extension portion 160 extending from base portion 158. Base portion 158 provides for securement of workpiece engagement member 48 relative to endless loop drive member 132 wherein, in the absence of biasing pressure, extension portion 160 extends generally straight outward from endless loop drive member 132, see FIG. 6b and FIG. 6c. Extension portion 160 has a workpiece contacting portion 162 extending along substantially the entire length on a forward side thereof. Workpiece contacting portion 162 is the surface which routinely makes contact with workpieces, not shown in these views, while moving in collecting direction 52. Extension portion 160 generally has a yielding resistance level to displacement. Extension portion 160 further has a first bending position 164 and a second bending position 166. First bending position 164 has a yielding resistance level and second bending position 166 has a yielding resistance level. First bending position 164 and second bending position 166, as well as the rest of extension portion 160, cooperate to provide for substantial bending of extension portion 160 relative to base portion 158 when significant pressure is applied to extension portion 160. During movement within the tubular housing in redeployment direction 54 such pressure is applied by a wall 168 and provides for such bending wherein an extremely small amount of space is required for workpiece engagement member 48 within tubular housing 120. When wall 168 is cleared extension portion 160 of workpiece engagement member 48 returns to its original positioning, see FIG. 6b. Extension portion 160 of workpiece engagement member 48 then remains at such positioning during movement in collecting direction 52, see FIG. 6c, in the absence of significant pressure applied thereto.

Secondary Conveyance

The workpieces being conveyed may simply be discharged at the discharge area. Alternatively, it may be a desire to provide for subsequent conveyance of the workpieces. Due to the relatively long nature of the discharge area a particularly expedient method of secondary conveyance, and one ideally suited when the conveyer device is employed during a harvesting of a crop, is to provide a standard belt type conveyer along the discharge area of the conveyer device. If desired, additionally conveyer devices may be employed in cooperation with the conveyer positioned along the discharge area to transfer the workpiece to a desired eventual discharge location.

FIG. 1 and FIG. 10 through FIG. 17 depict secondary conveyance device 84, or portions thereof. Secondary conveyance device 84 has a horizontal transfer conveyer 170 and a vertical transfer conveyer 172. Horizontal transfer conveyer 170 extends substantially the entire length of discharge area 58 and provides for movement of any workpieces discharged thereonto in a direction of conveyance 174. Horizontal transfer conveyer 170 discharges any workpieces positioned thereon onto vertical transfer conveyer 172. Vertical transfer conveyer 172 has a series of paddles 176, as conventionally known in the art, which provides for movement of any workpieces discharged thereonto in a direction of conveyance 178. Vertical transfer conveyer 172 discharges any workpieces positioned thereon at an elevated discharge area 180.

Low Profile of the Conveyer Device

It is a very strong desire to provide for a conveyer device having an extremely shallow profile where the collection zone may be positioned as close as possible to a ground surface therebeneath. This is particularly true when the conveyer device is going to be utilized for the gathering of a crop during a mechanical harvesting operation performed upon the crop. In order to be functional for this purpose it is a strong desire that the conveyer device be positioned beneath the plant or tree without requiring any modification to the plant or tree such as skirting to remove the low lying limbs or branches.

FIG. 2 and FIG. 12 depict the low profile nature of conveyer device 30. This low profile nature of conveyer devices having features of the present invention provide for utilization in situations where utilization of conventional conveyer devices would be impractical.

Debris Removal

It may be a desire during numerous types of collection and/or conveyance of workpieces to provide for a removal of select material or select workpiece through the collection zone while conveying select workpieces across the collection zone. A first example of such removal involves removal of a debris from the workpieces. This is particularly desirable when a conveyer device having features of the present invention is utilized during a harvesting operation. During such an operation portions of the parent tree or plant, such as leaves and stems, are routinely separated from the parent tree or plant and intermixed with the harvested fruit. A second example of such removal involves separation for sorting of workpieces based upon a sizing of the workpieces.

FIG. 1, FIG. 3, FIG. 10 and FIG. 11 depict a series of passageways 182 between each adjacent pair of tubular housings 120. Passageways 182 are sufficiently narrow that passage therethrough of mature fruit 184, being workpieces 32 in this example, is prohibited while allow passage therethrough of a significant number of leaves 185 and branches 156 prior to conveyance to discharge area 58.

Transport of the Conveyer Device

The conveyer device may be stationarily positioned during operation thereof or may be moveable during operation. When it is a desire to provide for transport of the conveyer device during operation, the conveyer device may have separate means attached thereto to provide for the desired motion. Alternatively, the conveyer device may simply be attached to another device which possess means to move. This is particularly desirable where the conveyer device is intended to gather and convey crops during a mechanical harvesting operation thereof. When the conveyer device is attached to another moveable device it may be a strong desire to provide means to place the conveyer device in an operational orientation and remove the conveyer device from such placement. Many methods are known in the art to provide for such transfer and many of these methods may be readily employed with the present invention. Examples of such known methods include pivotal displacement and sliding displacement.

FIG. 1 and FIG. 2 depict conveyer device 30 with additional collection and conveyance devices, in the form of secondary conveyance device 84, extension assembly 74 and rear extension assembly 82, positioned thereby. FIG. 10 through FIG. 17 depict such combination, or portions thereof, attached to harvesting machine 86. As most clearly shown in FIG. 1 a hinge 186 extends along conveyer device 30 rearward from power distribution housing 104 and in close proximity to discharge area 58. Hinge 186 is secured to conveyer device 30 and harvesting machine 86 at secondary conveyance device 84. Opposing power units 188, see FIG. 12, FIG. 13 and FIG. 15, of any suitable type known in the art, provide for movement of conveyer device 30 selectively between a storage orientation 190, see FIG. 16, and an operational orientation 192, see FIG. 12, FIG. 13 and FIG. 15.

Figure 15:
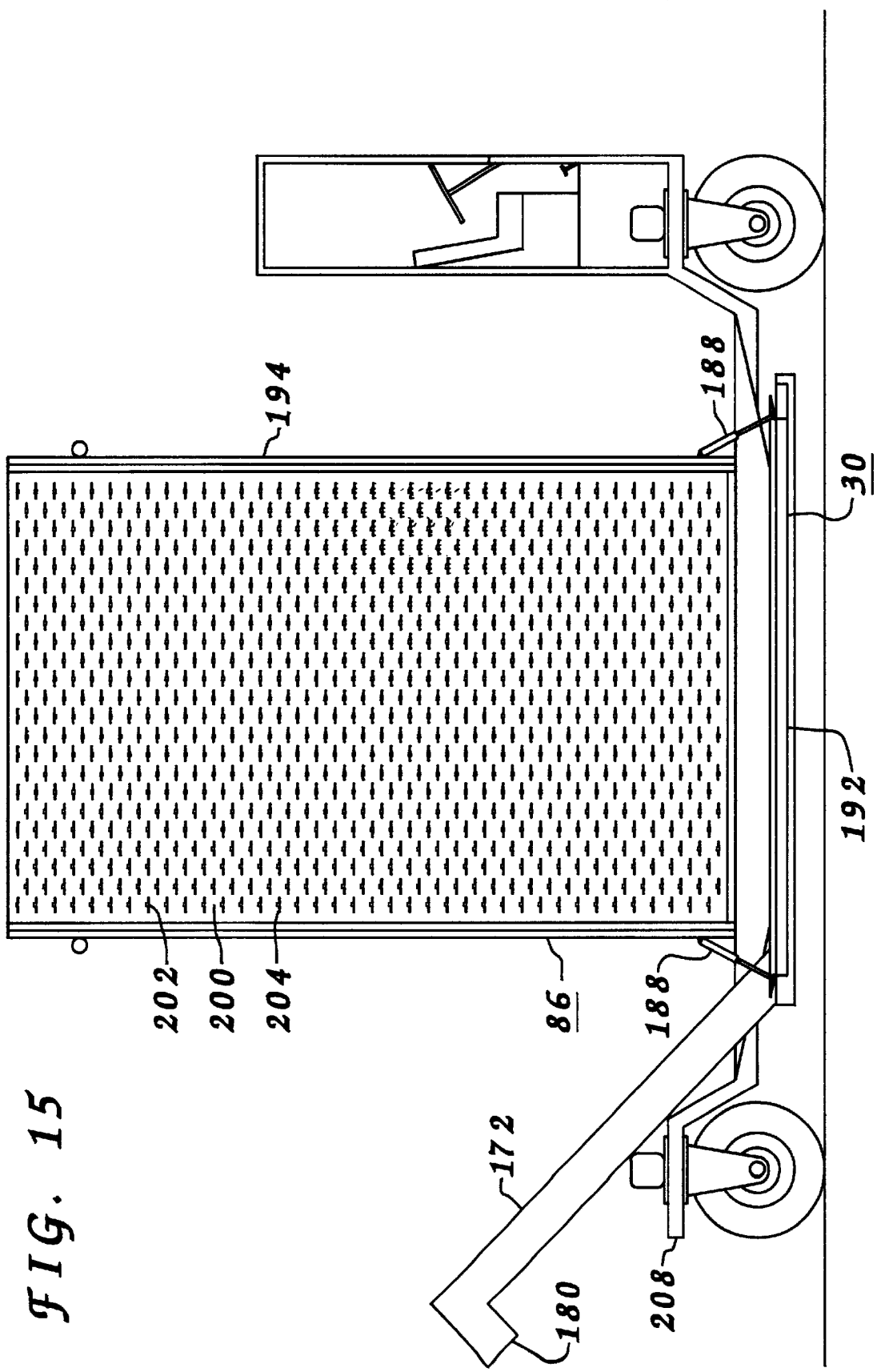
FIG. 15 is a side elevational view of the harvesting machine in the operational state depicted in FIG. 10 and FIG. 12.
Figure 16:
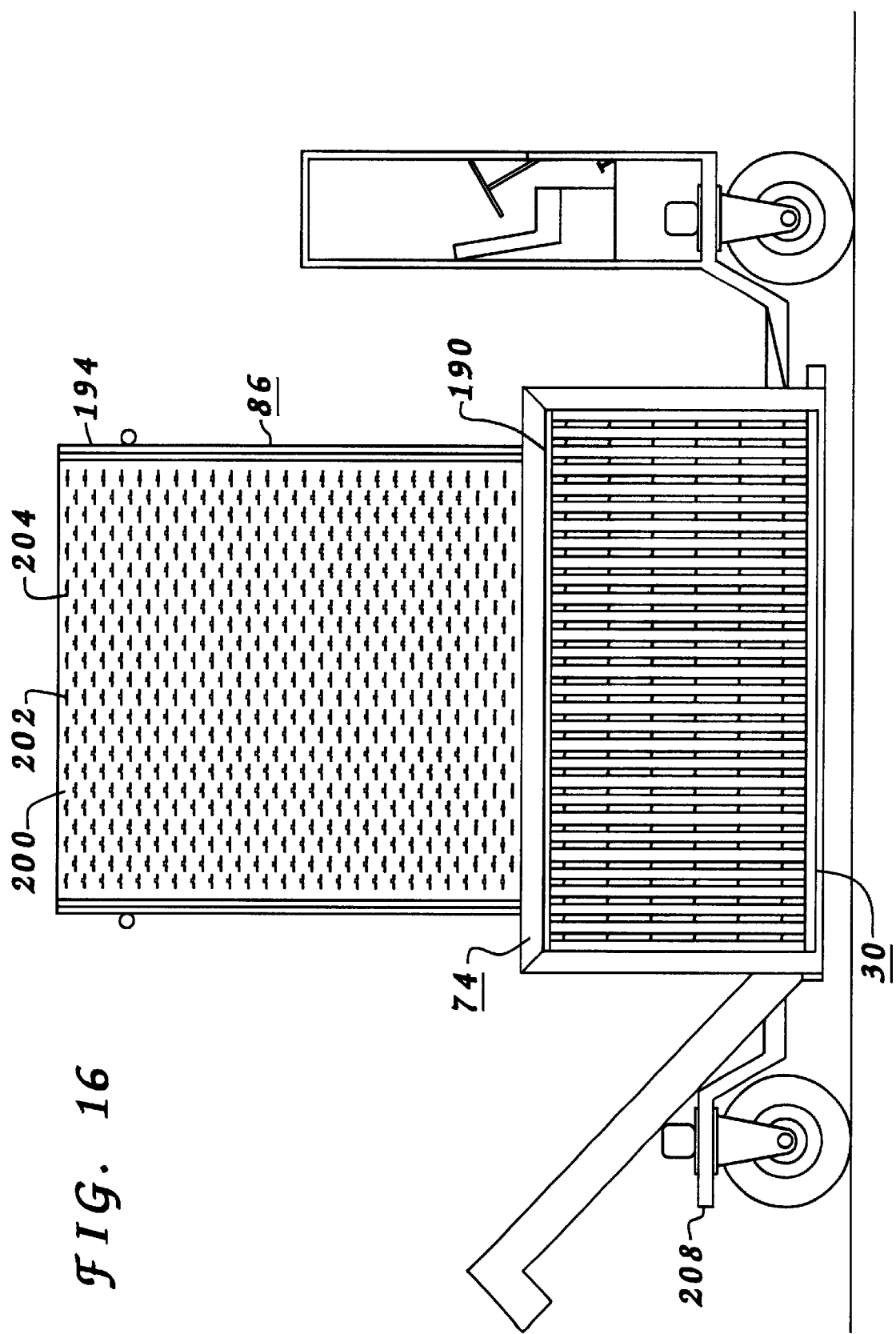
FIG. 16 is a side elevational view of the harvesting machine as depicted in FIG. 15 with the conveyer device in a storage orientation while the arm assembly of the harvesting machine is in an operational orientation.
Figure 17:
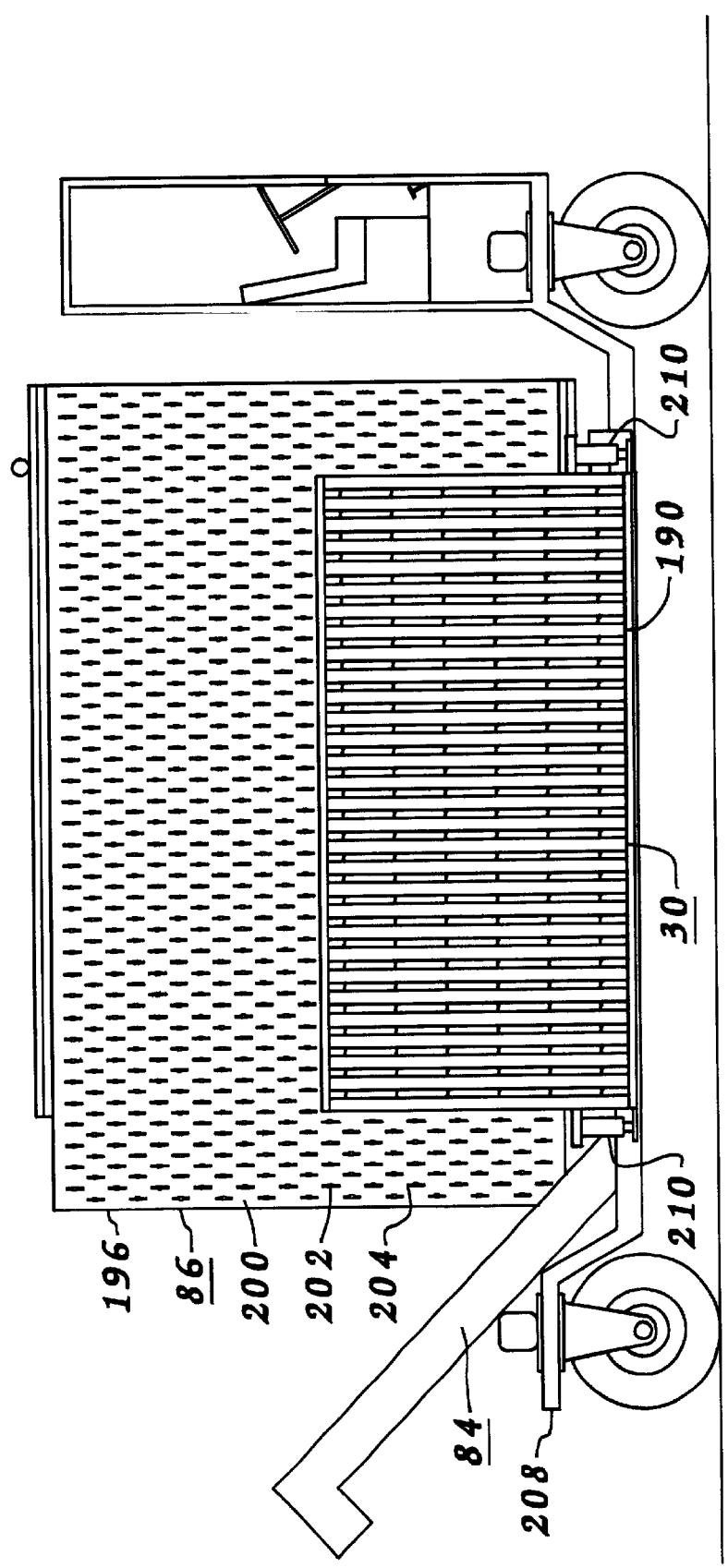
FIG. 17 is a side elevational view of the harvesting machine with both the conveyer device and the arm assembly in their respective storage orientation.

FIG. 16 and FIG. 17 depict conveyer device 30 in storage orientation 190 relative to harvesting machine 86 wherein conveyer device 30 has been pivotally tipped upward to minimize a dimensional size of harvesting machine 86. While conveyer device 30 is in storage orientation 190 harvesting machine 86 may be readily moved about. Such movement may involve repositioning during a harvesting operation or may involve transport prior to or following a harvesting operation or general transport. FIG. 16 depicts conveyer device 30 in storage orientation 190 while harvesting machine 86 is in an operational orientation 194. FIG. 15 depicts harvesting machine 86 in operational orientation 194 while conveyer device 30 is in operational orientation 192. While in these orientations 192 and 194 respectively, harvesting machine 86 may harvest fruit. FIG. 17 depicts conveyer device 30, with extension assembly 74 removed, in storage orientation 190 while harvesting machine 86 is in a transport orientation 196 as would exist during storage of or non-harvesting operation of harvesting machine 86.

It being noted that the configuration of canopy penetration, fruit hook engagement and canopy withdrawal method type harvesting machines are ideally suited for use with conveyer devices having features of the present invention. The low profile afforded by such conveyer devices are extremely suited to such harvesting machines which are suited to harvesting trees which have not been skirted and therefore have very low hanging branches. Additionally, the spacing of the transfer assemblies of the conveyer device and the spacing of the arms of the harvesting machine may be coordinated to allow for a mating therebetween when the conveyer device is positioned in the transport orientation.

Fruit Harvesting

Conveyer devices having features of the present invention may be utilized with many types of mechanical crop harvesting machine which perform their respective harvesting using many distinct harvesting methods.

FIG. 10 through FIG. 17 depict harvesting machine 86 which utilizes a canopy penetration, fruit hook engagement and canopy withdrawal method of harvesting. Conveyer device 30 is attached relative to harvesting machine 86 wherein conveyer device 30 may gather and convey workpieces, in this example citrus fruit generally and oranges specifically, as harvested by harvesting machine 86 from trees 198, see FIG. 1 and FIG. 2. Harvesting machine 86 has an arm housing member 200 having positioned relative thereto a plurality of penetration arms 202. Each penetration arm 202 has extending therefrom a plurality of picking fingers 204. During a harvesting cycle of harvesting machine 86, arm housing member 200 is extended into trees 198, see displacement between FIG. 10 and FIG. 11, and retracted from trees 198, see displacement between FIG. 11 and FIG. 10. During the retraction of penetration arms 202 picking fingers 204 engage individual mature fruits 184 (being the workpieces to be conveyed in this embodiment) and sever them from tree 198. Once mature fruit 184 is free from tree 198 mature fruit 184 falls downward to land upon collection zone 42, including extension assembly 74. During the harvesting operation of harvesting machine 86 conveyer device 30 may be either operated continuously or intermittently. Preferably conveyer device 30 is continuously operated to transfer any fruit falling thereupon to secondary conveyance device 84 for subsequent transference to elevated discharge area 180.

While conveyer device 30 is in operational orientation 192 harvesting machine 86 preferably moves adjacent a row 206 of trees 198, see FIG. 1 and FIG. 2, without special manipulation of conveyer device 30. In this instance harvesting machine 86 provides the lateral transfer means to move conveyer device 30 along row 206. This is due to the stationary positioning of conveyer device 30 relative to a chassis 208 of harvesting machine 86 wherein conveyer device 30 moves with harvesting machine 86 during advance along row 206. Alternatively, conveyer device 30 may be attached to harvesting machine 86 for displacement movement, not shown, relative to chassis 208. In this embodiment conveyer device 30 may move inward relative to row 206 during each insertion cycle of arm housing member 200 and may move outward relative to row 206 during each withdrawal cycle of arm housing member 200. One example of this displacement may involve a cessation of conveyance during the displacement toward and away from the row wherein the fruit may fall upon the collection zone and simply remain there during the displacement of the arm housing. Then once the conveyer device is back at the harvesting machine the conveyance may proceed to clear any fruit positioned upon the collection zone while the harvesting machine advances along the row to a subsequent harvesting position.

In certain deployment situations it is a strong desire to provide for elevational adjustment of the conveyer device relative to the prevailing grade of the ground upon which the conveyer device is positioned. This is particularly desirable when the conveyer device is utilized during a harvesting of a crop where various conditions of terrain may exist. Many methods are conventionally known in the art to provide such elevational adjustment and many of these may be utilized with the present invention.

FIG. 17 depicts conveyer device 30 attached to harvesting machine 86 wherein opposing lift units 210 provide for elevational adjustment of conveyer device 30, along with secondary conveyance device 84, relative to harvesting machine 86. This arrangement provides the operator with the ability to manipulate conveyer device 30 depending upon specific conditions which exist during the harvesting operation.

Additionally, it may be necessary to provide the conveyer device with an ability to angularly self correct relative to the harvesting machine during movement adjacent a row of trees during a harvesting operation. One method of providing this angular self correcting involves placement of a wheel or a skid at, or near, the outer leading corner of the conveyer device to follow the contour of the ground. When this is provided it is a strong desire to provide the assembly which supports the conveyer device relative to the harvesting machine with the ability to absorb sudden upward movement of the conveyer device without any possibility of damage being inflicted upon any of the structures. One method of providing this sudden upward movement absorption involves providing for the power units to support the conveyer device while an anchor portion of each rests at a lower extent of a respective guide channel. This arrangement provides for the anchor portion of each power unit to move upward within the guide channel unimpeded during the sudden upward movement of the conveyer device.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A conveyer device to provide for a conveyance of workpieces, the conveyer device comprising:
   a) a power source;
   b) power transfer means to provide for distribution of power from the power source;
   c) a plurality of transfer assemblies arranged to form a collection zone upon which the workpieces may be gathered, each transfer assembly positioned to extend generally across the collection zone, each transfer assembly having at least one adjacent transfer assembly, each transfer assembly comprising:
      1) an endless loop drive member moving in an endless loop in response to power from the power transfer means;
      2) drive means to provide for moving any encountered workpieces across the collection zone, the drive means having at least one workpiece engagement member, each workpiece engagement member having a cycle of movement powered by movement of the respective endless loop drive member to move therewith in the endless loop, the cycle of movement comprising:
         i) a collecting direction wherein at least select portions of the workpiece engagement member moves relative to the collection zone in a direction of conveyance at a gathering position wherein the respective workpiece engagement member moves relative to the collection zone and makes contact with at least a first encountered workpiece present on the collection zone to move any encountered workpieces in the direction of conveyance;
         ii) a redeployment direction wherein the workpiece engagement member moves relative to the collection zone opposite the direction of conveyance at a passage position wherein at least select portions of the respective workpiece engagement member remains substantially beneath the collection zone.

2. The conveyer device defined in claim 1 wherein the transfer assemblies are substantially aligned along the length of the collection zone wherein each transfer assembly is generally parallel to each respective adjacent transfer assembly.

3. The conveyer device defined in claim 1 further comprising a discharge area which extends substantially the entire width of the collection zone.

4. The conveyer device defined in claim 1 wherein the width of the collection zone is significantly greater than the length of the collection zone.

5. The conveyer device defined in claim 1 wherein the conveyer device further comprises a plurality of troughs with each trough positioned adjacent a respective transfer assemblies.

6. The conveyer device defined in claim 5 further comprising:
   a) a plurality of tubular housings, each tubular housing having an interior, an outer upper surface and an access slot;
      and wherein each of the trough is formed by a cooperation between the outer upper surfaces of an adjacent pair of tubular housings;
      and wherein each endless loop drive member of each transfer assembly is at least partially housed within the interior of a respective tubular housing;
      and wherein each workpiece engagement member of each transfer assembly further comprises a flexibility;
      and wherein each workpiece engagement member extends outward through the access slot of the respective tubular housing during movement in the collecting direction;
      and wherein each workpiece engagement member bends and remains within the interior of the tubular housing distal from the access slot during at least a portion of the movement in the redeployment direction.

7. The conveyer device defined in claim 1 wherein each of the workpiece engagement members further comprises:
   a) a base portion for attachment of the workpiece engagement member to the endless loop drive member;
   b) an extension portion extending outward from the base portion, the extension portion formed of a flexible material and wherein the extension portion comprises:
      1) a workpiece contacting portion positioned distal from the base portion, the workpiece contacting portion to provide for contact with the first encountered workpiece during the movement in the collecting direction, the workpiece contacting portion having a yielding resistance to bending;
      2) a first bending position positioned in close proximity to the base portion, the first bending position having a yielding resistance to bending, the yielding resistance of the first bending position significantly less than the yielding resistance of the workpiece contacting portion;
      3) a second bending position positioned between the first bending position and the workpiece contacting portion, the second bending position having a yielding resistance to bending, the yielding resistance of the second bending position significantly less than the yielding resistance of the workpiece contacting portion.

8. The conveyer device defined in claim 1 wherein the endless loop drive member further comprises an angular offset from horizontal wherein the workpiece engagement members extent generally perpendicular from the endless loop drive member and generally match the angular offset of the endless loop drive member.

9. A conveyer device to provide for a conveyance of workpieces in a direction of conveyance, the conveyer device comprising:
   a) a power source;
   b) power transfer means to provide for distribution of power from the power source;
   c) a plurality of support surfaces arranged to form a collection zone upon which the workpieces may fall, the collection zone having a length generally aligned with the direction of conveyance and a width extending generally perpendicular to the direction of conveyance, each support surface fixedly positioned to extend across the collection zone generally aligned with the direction of conveyance, each support surface having an upper extent, each of the support surfaces having at least one adjacent support surface, each support surface having a spacing from any adjacent support surfaces;
   d) a plurality of transfer assemblies, each transfer assembly to provide for conveyance of the workpieces positioned between a respective pair of adjacent support surfaces, each transfer assembly comprising:
      1) an endless loop drive member moving in an endless loop in response to power from the power transfer means;
      2) a plurality of workpiece engagement members, each workpiece engagement member of a respective transfer assembly secured relative to the endless loop drive member for a movement of each workpiece engagement member in an endless loop pattern, the endless loop pattern comprising:
         i) a collecting period wherein each workpiece engagement member moves across the collection zone in the direction of conveyance with a portion of the workpiece engagement member positioned between the pair of adjacent support surfaces at a gathering elevational height, the gathering elevational height sufficient to contact the workpieces residing between the respective pair of support surfaces;
         ii) a redeployment period wherein each workpiece engagement member moves relative to the collection zone opposite the direction of conveyance without contact with the workpieces residing between the respective pair of support surfaces;
      3) offset means to provide for disposing the endless loop drive member at an angular offset from horizontal.

10. The conveyer device defined in claim 9 further comprising a secondary conveyer, the secondary conveyer having a direction of conveyance and wherein the direction of conveyance of the secondary conveyer is generally perpendicular to the conveyance of the workpieces of the transfer assemblies of the conveyer device.

11. The conveyer device defined in claim 9 wherein the spacing between adjacent support surfaces further comprises a passageway to provide for passage therethrough of debris for removal of the debris from a conveyance process.

12. The conveyer device defined in claim 9 further comprising a plurality of tubular housings, each tubular housing having an interior and an outer upper surface;
    and wherein each of the support surfaces is formed by the outer upper surface of a respective tubular housing;
    and wherein each endless loop drive member of each transfer assembly is at least partially housed within the interior of a respective tubular housing.

13. The conveyer device defined in claim 12 wherein each of the tubular housings further comprises an access slot;
    and wherein each workpiece engagement member of each transfer assembly further comprises a flexibility;
    and wherein each workpiece engagement member extends outward through the access slot of the respective tubular housing during the collecting period;
    and wherein each workpiece engagement member bends and remains within the interior of the tubular housing distal from the access slot during at least a portion of the redeployment period.

14. The conveyer device defined in claim 9 wherein each of the support surfaces further comprises an arced cross sectional configuration extending along a longitudinal length.

15. A conveyer device to provide for a conveyance of fruit harvested from fruit trees by a mechanical fruit harvesting machine, the conveyance of fruit having a direction of conveyance, the conveyer device comprising:

a) a power source;

b) power transfer means to provide for distribution of power from the power source;

c) a plurality of support surfaces arranged to form a collection zone upon which the workpieces may fall, the collection zone having a length generally aligned with the direction of conveyance and a width extending generally perpendicular to the direction of conveyance, each support surface fixedly positioned to extend across the collection zone generally aligned with the direction of conveyance, each support surface having an upper extent, each of the support surfaces having at least one adjacent support surface, each support surface having a spacing from any adjacent support surfaces, the spacing to provide for a passageway between adjacent support surfaces to allow for passage of debris therebetween;

d) a plurality of transfer assemblies, each transfer assembly to provide for conveyance of the workpieces positioned between a respective pair of adjacent support surfaces, each transfer assembly comprising:

1) an endless loop drive member moving in an endless loop in response to power from the power transfer means;

2) a plurality of workpiece engagement members, each workpiece engagement member of a respective transfer assembly secured relative to the endless loop drive member for a movement of each workpiece engagement member in an endless loop pattern, the endless loop pattern comprising:

i) a collecting period wherein each workpiece engagement member moves across the collection zone in the direction of conveyance with a portion of the workpiece engagement member positioned between the pair of adjacent support surfaces at a gathering elevational height, the gathering elevational height sufficient to contact the workpieces residing between the respective pair of support surfaces;

ii) a redeployment period wherein each workpiece engagement member moves relative to the collection zone opposite the direction of conveyance without contact with the workpieces residing between the respective pair of support surfaces;

3) offset means to provide for disposing the endless loop drive member at an angular offset from horizontal.

16. The conveyer device defined in claim 15 wherein each of the support surfaces further comprises an upper extent of a tubular housing and wherein each of the endless loop drive members of a respective transfer assembly is housed in an interior of a respective tubular housing and wherein each workpiece engagement member of each transfer assembly further comprises a flexibility and wherein each of the workpiece engagement members of a respective transfer assembly extends from an access slot of a respective tubular housing during the collecting period and is transferred within the interior of the respective tubular housing during the redeployment period.

17. The conveyer device defined in claim 15 wherein the conveyer device further comprises lateral transfer means to provide for a movement of the conveyer device generally perpendicular to the direction of conveyance of the workpieces during at least a portion of an operation of the conveyer device.

18. The conveyer device defined in claim 15 wherein the fruit being conveyed is a citrus fruit.

19. The conveyer device defined in claim 15 wherein the conveyer device further comprises an operational orientation, a storage orientation and transfer means, the operational orientation to provide for the support surfaces of the conveyer device to be generally horizontal, the storage orientation to provide for the support surfaces of the conveyer device to be significantly offset from horizontal, the transfer means to provide for a displacement of the conveyer device between the operational orientation and the storage orientation.

20. The conveyer device defined in claim 15 wherein the mechanical fruit harvesting machine which harvests the fruit which is conveyed by the conveyer device utilizes a canopy penetration, fruit hook engagement and canopy withdrawal method of harvesting.

* * * * *